(12) United States Patent
Ghoshal et al.

(10) Patent No.: US 7,706,392 B2
(45) Date of Patent: Apr. 27, 2010

(54) DYNAMIC POWER MANAGEMENT IN A POWER OVER ETHERNET SYSTEM

(75) Inventors: Sajol Ghoshal, El Dorado Hills, CA (US); Michael Altmann, Folsom, CA (US)

(73) Assignee: Akras Silicon Inc., Folsom, CA (US)

( * ) Notice: Subject to any disclaimer, the term of this patent is extended or adjusted under 35 U.S.C. 154(b) by 838 days.

(21) Appl. No.: 11/464,175

(22) Filed: Aug. 11, 2006

(65) Prior Publication Data

US 2007/0041387 A1 Feb. 22, 2007

Related U.S. Application Data

(63) Continuation-in-part of application No. 11/207,595, filed on Aug. 19, 2005, now abandoned, and a continuation-in-part of application No. 11/207,602, filed on Aug. 19, 2005, now Pat. No. 7,469,348.

(51) Int. Cl.
*H04L 12/56* (2006.01)
*H04J 1/16* (2006.01)

(52) U.S. Cl. ................ 370/419; 370/252; 370/352

(58) Field of Classification Search ............ 370/389, 370/352–356, 400, 401, 252, 419
See application file for complete search history.

(56) References Cited

U.S. PATENT DOCUMENTS

| 2005/0085212 | A1   | 4/2005 | Peker et al. |
| 2005/0122140 | A1   | 6/2005 | Peker et al. |
| 2006/0082220 | A1 * | 4/2006 | Karam et al. .......... 307/4 |
| 2006/0082222 | A1   | 4/2006 | Pincu et al. |
| 2006/0117089 | A1 * | 6/2006 | Karam .............. 709/208 |
| 2006/0133368 | A1 * | 6/2006 | Tolliver ............. 370/389 |

\* cited by examiner

*Primary Examiner*—John Pezzlo

(57) ABSTRACT

A network system comprises dynamic power management controllers respectively configured for usage in a Power Sourcing Equipment (PSE) and a Powered Device (PD) coupled by a network cable in a configuration that transfers power and communication signals from the PSE to the PD. The dynamic power management controllers are configured to communicate power management information over the network cable at a Transmission Control Protocol/Internet Protocol (TCP/IP) layer and/or a Media Access Control (MAC) layer.

21 Claims, 19 Drawing Sheets

DYNAMIC POWER MANAGEMENT IN A POWER OVER ETHERNET SYSTEM

CROSS REFERENCE TO RELATED APPLICATIONS

This application is related to and incorporates herein by reference in its entirety for all purposes, U.S. patent application Ser. No.: 11/207,595 entitled "METHOD FOR HIGH VOLTAGE POWER FEED ON DIFFERENTIAL CABLE PAIRS," by John R. Camagna, et al. filed Aug. 19, 2005; and Ser. No. 11/207,602 entitled "A METHOD FOR DYNAMIC INSERTION LOSS CONTROL FOR 10/100/1000 MHZ ETHERNET SIGNALLING," by John R. Camagna, et al., which have been filed concurrently filed Aug. 19, 2005.

BACKGROUND

Many networks such as local and wide area networks (LAN/WAN) structures are used to carry and distribute data communication signals between devices. Various network elements include hubs, switches, routers, and bridges, peripheral devices, such as, but not limited to, printers, data servers, desktop personal computers (PCs), portable PCs and personal data assistants (PDAs) equipped with network interface cards. Devices that connect to the network structure use power to enable operation. Power of the devices may be supplied by either an internal or an external power supply such as batteries or an AC power via a connection to an electrical outlet.

Some network solutions can distribute power over the network in combination with data communications. Power distribution over a network consolidates power and data communications over a single network connection to reduce installation costs, ensures power to network elements in the event of a traditional power failure, and enables reduction in the number of power cables, AC to DC adapters, and/or AC power supplies which may create fire and physical hazards. Additionally, power distributed over a network such as an Ethernet network may function as an uninterruptible power supply (UPS) to components or devices that normally would be powered using a dedicated UPS.

Additionally, network appliances, for example voice-over-Internet-Protocol (VOIP) telephones and other devices, are increasingly deployed and consume power. When compared to traditional counterparts, network appliances use an additional power feed. One drawback of VOIP telephony is that in the event of a power failure the ability to contact emergency services via an independently powered telephone is removed. The ability to distribute power to network appliances or circuits enable network appliances such as a VOIP telephone to operate in a fashion similar to ordinary analog telephone networks currently in use.

Distribution of power over Ethernet (PoE) network connections is in part governed by the Institute of Electrical and Electronics Engineers (IEEE) Standard 802.3 and other relevant standards, standards that are incorporated herein by reference. However, power distribution schemes within a network environment typically employ cumbersome, real estate intensive, magnetic transformers. Additionally, power-over-Ethernet (PoE) specifications under the IEEE 802.3 standard are stringent and often limit allowable power.

An IEEE 802.3af specification defines requirements for designing PoE equipment. The standard sets forth two types of devices including Power Sourcing Equipment (PSE) and Powered Devices (PD). According to the standard, the PSE supplies 48 volts with a current limit of 350 mA to the PD which may be one of a wide variety of devices such as Voice-over-Internet-Protocol (VoIP) telephones, wireless access points, and many others. The standard limits the PSE to a continuous maximum power delivery of 15.2 watts, which after line losses amounts to a power delivery of 12.95 watts at the PD interface.

Different devices can require significantly different power levels. For example, a VoIP telephone can typically consume four to six watts while a dual-radio wireless access point can have a requirement of about 14-18 watts. In a conventional system, several power classification levels can be specified using handshakes between the PSE and the PD. The handshake operations typically begin when a PD product is connected to a PoE cable. The PSE reacts by sending a test voltage to determine whether the PD has a valid IEEE 802.3af signature. The detection signature results from a small current-limited voltage that is applied to the network cable. The voltage responds to the presence of a 25 K$\Omega$ resistor in the PD.

Such probing by the PSE can create erroneous results for various reasons such as variations in cable length, presence of diode bridges at the PD interface, and other conditions or phenomena can potentially lead to errors in selection of supplied power, either failure to supply adequate power or, more typically, supplying of substantially more power than is necessary. For example, the output voltage for the PSE to drive the PD varies for different cable lengths. The diode bridge, which is required under the IEEE 802.3 standard to supply polarity protection in case a connector is attached backwards and to enable operation with a PSE that sources either −48V or +48V, also can result in a voltage drop that may be difficult to quantify using static techniques.

If the PD responds with to the PSE detection signal with a valid signature, a test is performed to determine the PD power consumption classification. During the classification test, the PD attempts to sink a known current according to the IEEE 802.3af classification table. If the PD does not supply a proper current sink, the PSE assumes a default type of Class 0 for the PD. The PSE supplies 48V to the PD only after results of the classification test are complete.

In the conventional operation, power allocation is a static process. The classification current identifies the amount of power to be supplied. A PD is designed to request a typically worst-case amount of power during the classification test, an amount that is typically estimated with a sufficient margin, often twenty to fifty percent, to prevent inoperability or failure due to lack of power due to coarse steps defined in the power classification table. Often the margin is extended to account for variability in actual power delivered by identical power supply models, a variability that may be significant even within the products of a particular manufacturer and within a particular model from the same manufacturer.

In the standard power management process, IEEE 802.3af handshake operations between the PSE and PD operate in the physical layer to set up a current, measure a current, then request a power supply level based on the measured current. The current can only be changed by terminating the link, then reinstating the link, and initializing using the handshake operation. Accordingly, the standard system is inherently static and cannot easily respond to dynamically changing demand without terminating the link.

SUMMARY

According to an embodiment of a network system, dynamic power management controllers are respectively configured for usage in a Power Sourcing Equipment (PSE) and a Powered Device (PD) coupled by a network cable in a configuration that transfers power and communication signals from the PSE to the PD. The dynamic power management controllers are configured to communicate power management information over the network cable at a Transmission Control Protocol/Internet Protocol (TCP/IP) layer and/or a Media Access Control (MAC) layer.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
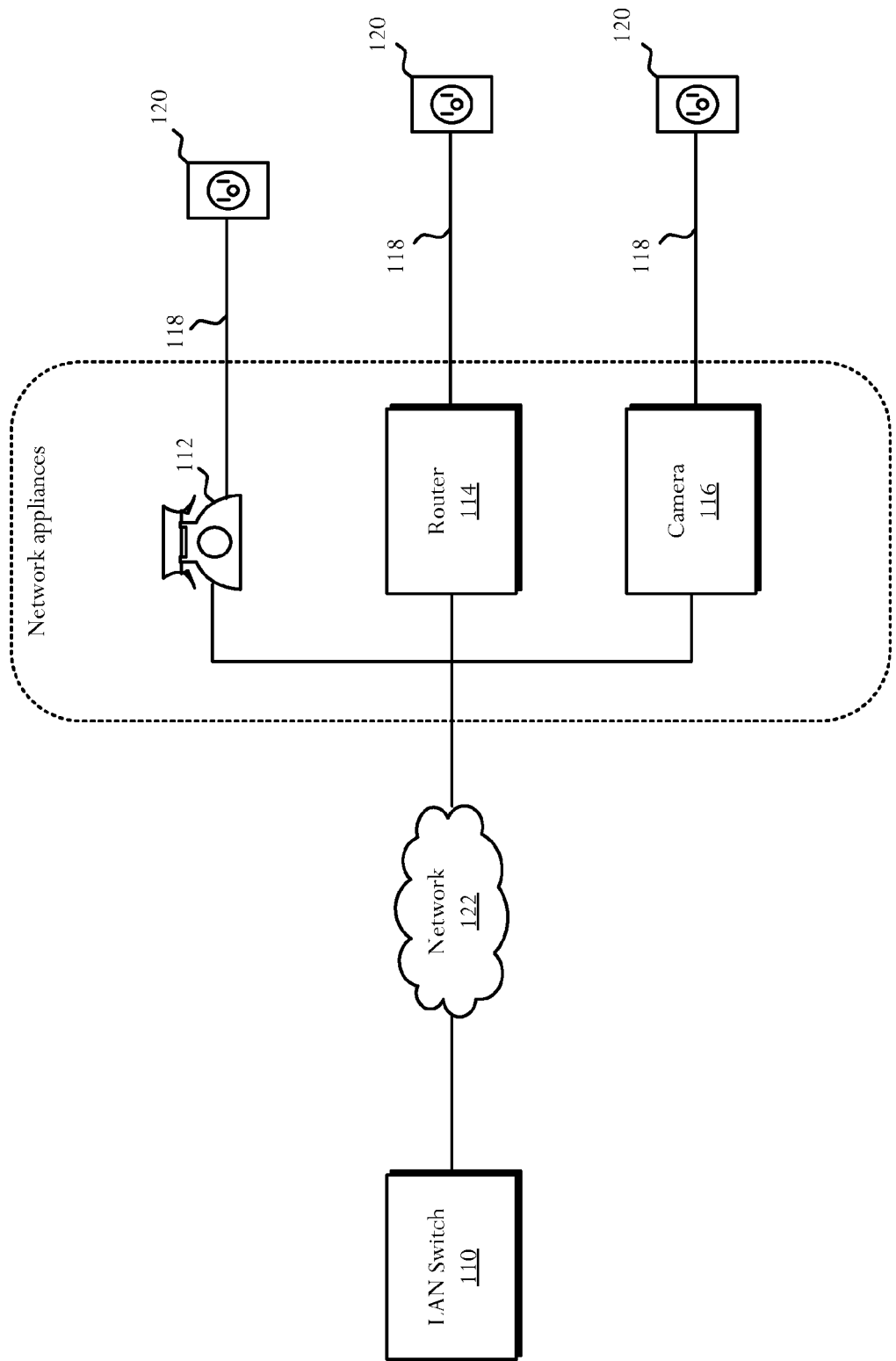
FIGS. 1A and 1B are schematic block diagrams that respectively illustrate a high level example embodiments of client devices in which power is supplied separately to network attached client devices, and a switch that is a power supply equipment (PSE)-capable power-over Ethernet (PoE) enabled LAN switch that supplies both data and power signals to the client devices.

Dynamic power management enables allocation of power from one or more Power Sourcing Equipment (PSE) and one or more Powered Devices (PDs) according to instantaneous demand. An individual PD may have a wide range of power demand according to conditions and application. Some devices draw a relatively constant level of power. A majority of devices can have a wide range of power consumption that vary over time. Dynamic power management enables supplied power levels to change depending on operations a device is performing.

For example, a hand-held consumer camera that is not panning or tilting draws on the order of six watts of power. However, when the camera is tilted the motors are activated and draw a substantial amount of power such as up to 20 watts. Some operators may only pan a few times in a day or week. Accordingly, a dynamic power management technique can be applied, for example, in a system with a 200 watt power supply that is designed to allocate, on average, 20 watts over ten ports, and that 99% of the time draws no more than a total of 100 watts. The dynamic power management application can dynamically adjust power using a statistical power management approach, for example, by supplying ten watts per port and responding to requests by the PDs for more power, when appropriate.

The dynamic power management system enables a PD to essentially immediately request a power level based on instantaneous demand. For a system with a maximum total demand that is less than the total supply, the system responds to PDs requesting a higher power while allocating a smaller power level to PDs that do not request a higher power. The probability is that peak requirements will not be synchronized except in a worst case scenario.

Various combinations of dynamic power management techniques can operate at one or more of multiple levels or layers. For example, dynamic power management can be supported by one or more of three methods. Ethernet packets can be used at the Transmission Control Protocol/Internet Protocol (TCP/IP) levels to request selected power, for example an increased power, from a Power Sourcing Equipment (PSE). In other embodiments and applications, a method can support a dynamic power management method using Type of Service (TOS) bits in a Transmission Control Protocol/Internet Protocol (TCP/IP) header to assign priority according to traffic, for example a higher priority assigned to high priority traffic, for statistical power management. Some embodiments and/or applications can optionally support a method of indicating information in an 8b/10b encoder to transmit requests to a PSE.

For higher power applications, the PSE and PD can negotiate at the Institute of Electrical and Electronics Engineers (IEEE) Standard 802.3af level, for example indicating that the PD is enabled for high power such as with maximum power enabled, for static power management.

The illustrative techniques can be used for dynamic and statistical power management for performance individually or in combination to improve power supply utilization.

Figure 3:
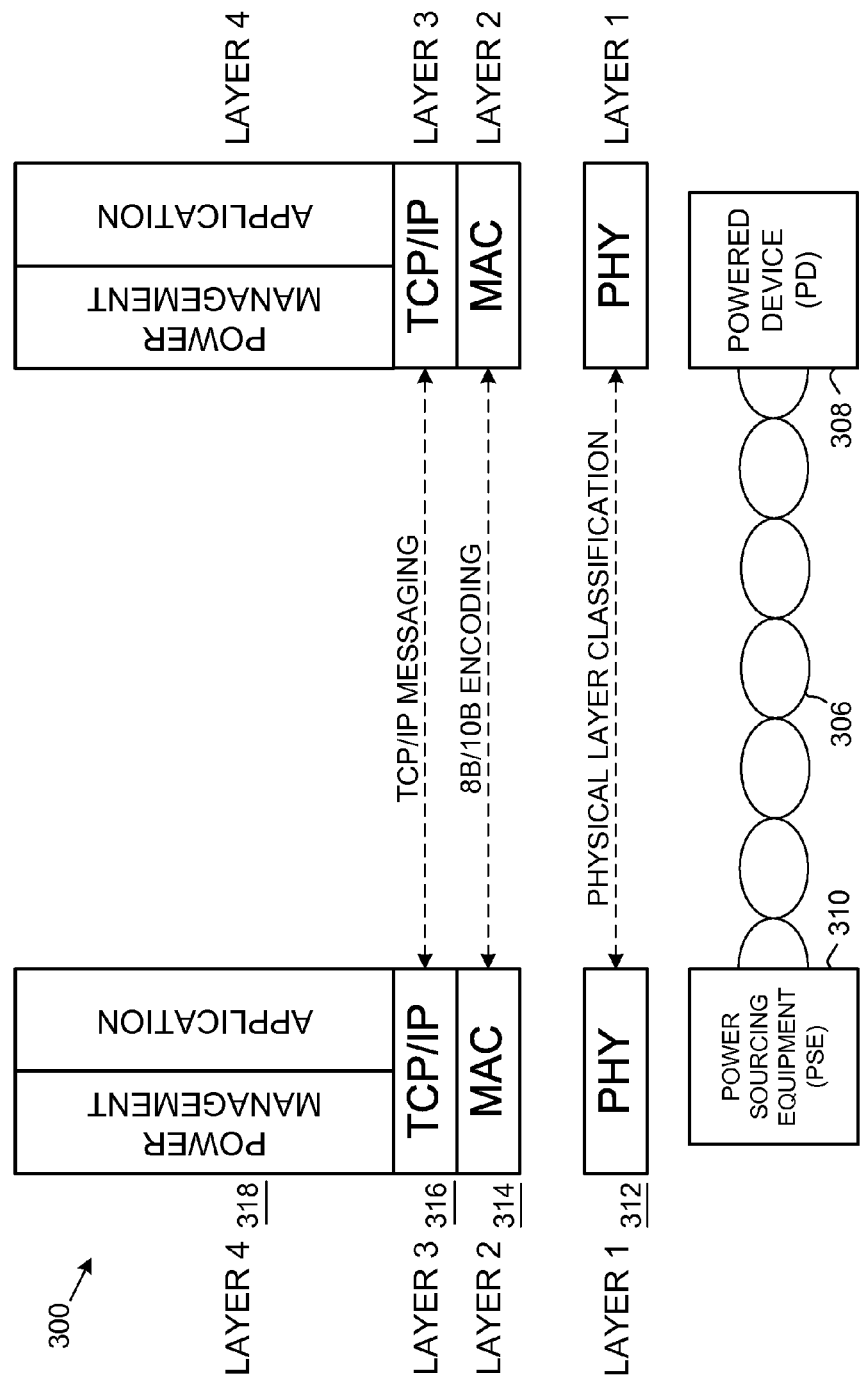
FIG. 3 is a schematic block diagram that depicts a dynamic power management system that can use one or more of multiple techniques for communicating over a network to manage power over Ethernet.

Referring to FIG. 3, a schematic block diagram illustrates a dynamic power management system 300 that can use one or more of multiple techniques for communicating over a network to manage power over Ethernet. The network includes communication between Power Sourcing Equipment (PSE) 310 and a Powered Device (PD) 308 over a network cable 306. A single method or a combination of multiple methods can be used to transmit power management information over an Ethernet system.

At the physical layer 312, shown as layer 1, power management information is communicated through a current-based classification scheme, for example according to IEEE 802.3af standard and/or an enhanced classification scheme which implement static power management that can be combined with dynamic power management.

At the Media Access Control (MAC) layer 314, shown as layer 2, power management information is communicated using 8b/10b reserved codes for communicating demand-based power requirements. The 8b/10b line codes, as conventionally used in communications, maps 8-bit symbols into 10-bit symbols to attain DC balance and bounded disparity, and further enable sufficient state transitions in the serial data stream to facilitate clock recovery from embedded data. The 8b/10b line codes facilitate high data rates by reducing intersymbol interference. Eight bits of data are transmitted as a 10-bit entity called a symbol or character. The lower five data bits are encoded into a 6-bit group and the higher three bits encoded into a four-bit group. The code groups are concatenated to form a 10-bit symbol for transmission. According to published standard, the symbols can be data symbols or special symbols, which can be control characters indicating end-of-frame, link idle, skip, and other similar link-level conditions.

In the illustrative power management system, the 8b/10b special symbols can be enhanced or extended in comparison to standard usage to define power management information that can be transferred between PSE and PD. The 8b/10b special symbols can be defined to perform power management including symbols to increase power and to reduce power.

In an example 8b/10b operation, Ethernet communicates at a rate 100 megabits but actually transmits 125 megabits due to the addition of two extra bits that facilitate error correcting and can be used to create spare codes in the additional bits. In an illustrative dynamic power management operation, the spare codes can be used to request increases or reductions in power. In other embodiments or applications, the spare codes may be used to define requested power levels.

The layer 2 operation can be operative when the link is connected and an application is functioning in the Internet Protocol (IP) level or layer 2. Packets are sent back and forth between the PSE and PD, including requests by the PD for higher power, requests to reduce power to nominal levels, requests appropriate for conditions, possibly in combination with other information to facilitate power management.

At the Transmission Control Protocol/Internet Protocol (TCP/IP) layer 316, illustrated as layer 3, an Ethernet packet can be sent from the PD 308 to the PSE 310 to indicate various information and/or conditions such as power demand or requirements, current power requirements, device (PD) identification and other information relating to the PD 308, and other information. In some embodiments, Type of Service (TOS) bits can be used to specify priority for supplying power among devices.

Type of Service (TOS) bits are a set of four-bit flags in the Internet Protocol (IP) header. When any one of the TOS bit flags is set, a datagram is handled by a router in a manner different from handling of datagrams with no TOS bits set. Each of the four TOS bits has a different purpose and only one TOS bit may be set at any time. TOS bits are termed "type of service" by virtue of usage to enable an application that transmits data to inform the network of the type of network service to be delivered. According to conventional specifications, available classes of network service include minimum delay, maximum throughput, maximum reliability, and minimum cost.

In some conditions and/or applications, the latency for a datagram to travel from a source host to a destination host may be important. A network provider that can use multiple network connections with variable latency between the network connections may ensure that faster network connections are used when the minimum delay class of network service is selected.

In other conditions and/or applications, latency may be immaterial but the volume of data that is transmitted during a time interval may be important. A network provider may choose to route datagrams specified as maximum throughput to higher bandwidth network routes whereby higher latency of the routes can be tolerated.

Maximum reliability service can be selected for conditions and/or applications in which certainty that data arrive at the destination without retransmission is desired. Some network connections are more reliable than others. When maximum reliability service is desired, the network provider may ensure that more reliable networks are used for transmission.

Minimum cost service may be invoked when the cost of transmission is sought. Bandwidth leasing rates may be variable among multiple network connections. When minimum cost service is selected, a network provider may route a datagram over lost cost routes.

In the illustrative power management system, TOS bit usage can be enhanced or extended in comparison to standard usage to define power management information that can be transferred between PSE and PD that specifies priority for supplying power among multiple devices.

Accordingly, the traditional usage of Type of Service (TOS) bits in the TCP/IP header is to specify priority of bandwidth allocation. A packet with TOS bits specifying higher priority is allocated bandwidth over a packet with lower priority. If insufficient bandwidth exists to handle all requests, lower priority packets may be discarded and transmission blocked while higher priority packets are successfully transmitted. The illustrative technique extends the operation of TOS bits to define power priority on the basis that, if information has higher priority and packets cannot afford to be lost, then similarly power to the PD cannot afford to be lost.

In various embodiments, the TCP/IP layer 316 operations of the dynamic power management system can include power control commands or information in a TCP/IP packet. At the top of the TCP/IP stack, a packet is decoded and the IP address and port address are placed on the header of the TCP/IP packet which can be sent from a PD to a PSE to request the PSE to increase power or reduce power. The packets can also encode further information such as statistical information, average power drawn, fault information and other types of information. Codes can be defined for encoding the power management information. Some bits can be assigned indicating demand for power, requests to reduce power, a specific amount of power can be requested, or the like.

The power management application 318 operates at layer 4.

Figure 4A:
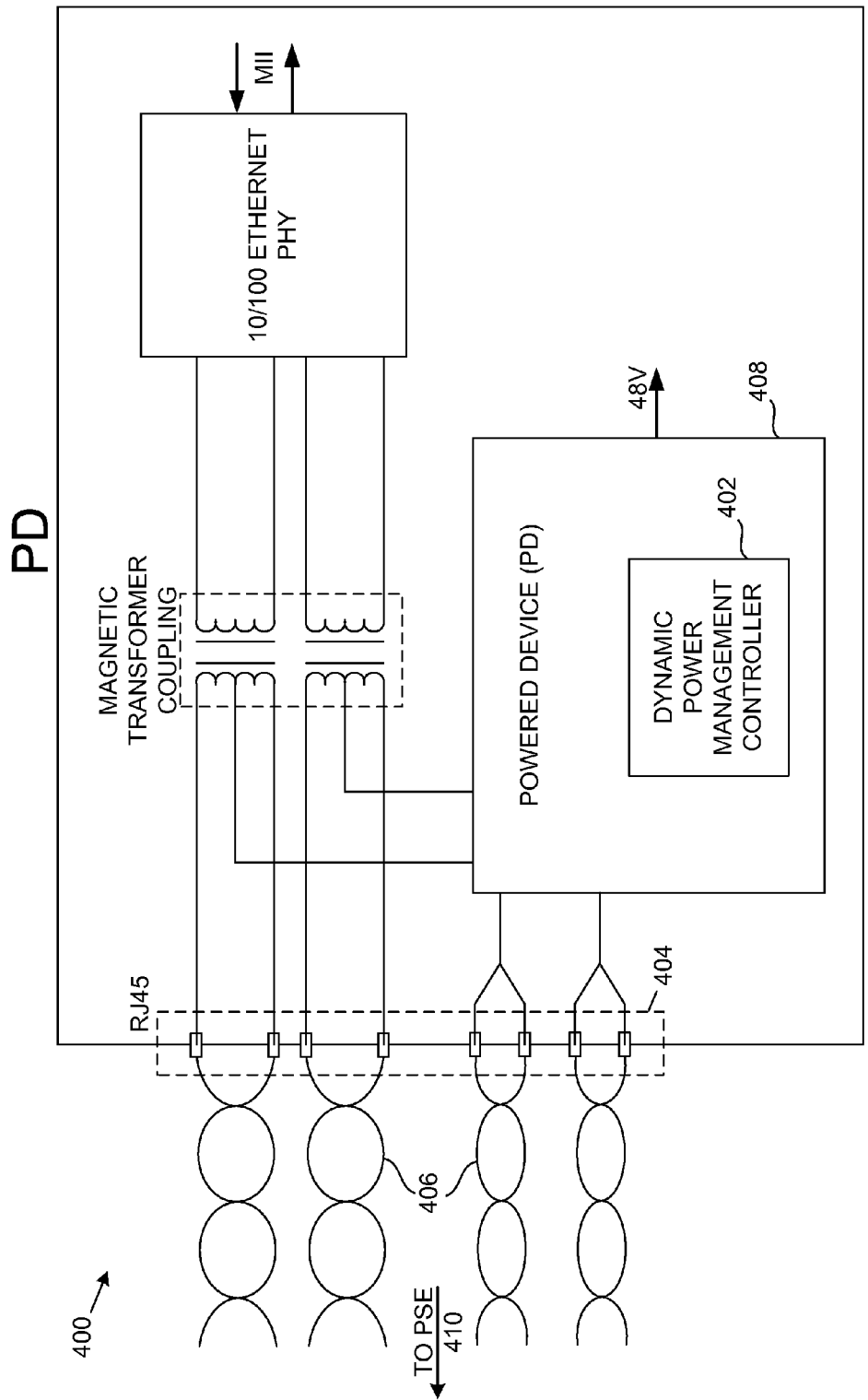
FIGS. 4A and 4B are schematic block and circuit diagrams that depict embodiments of a network device adapted for dynamic power management in a Power-over-Ethernet application in association with a Powered Device (PD)
Figure 4B:
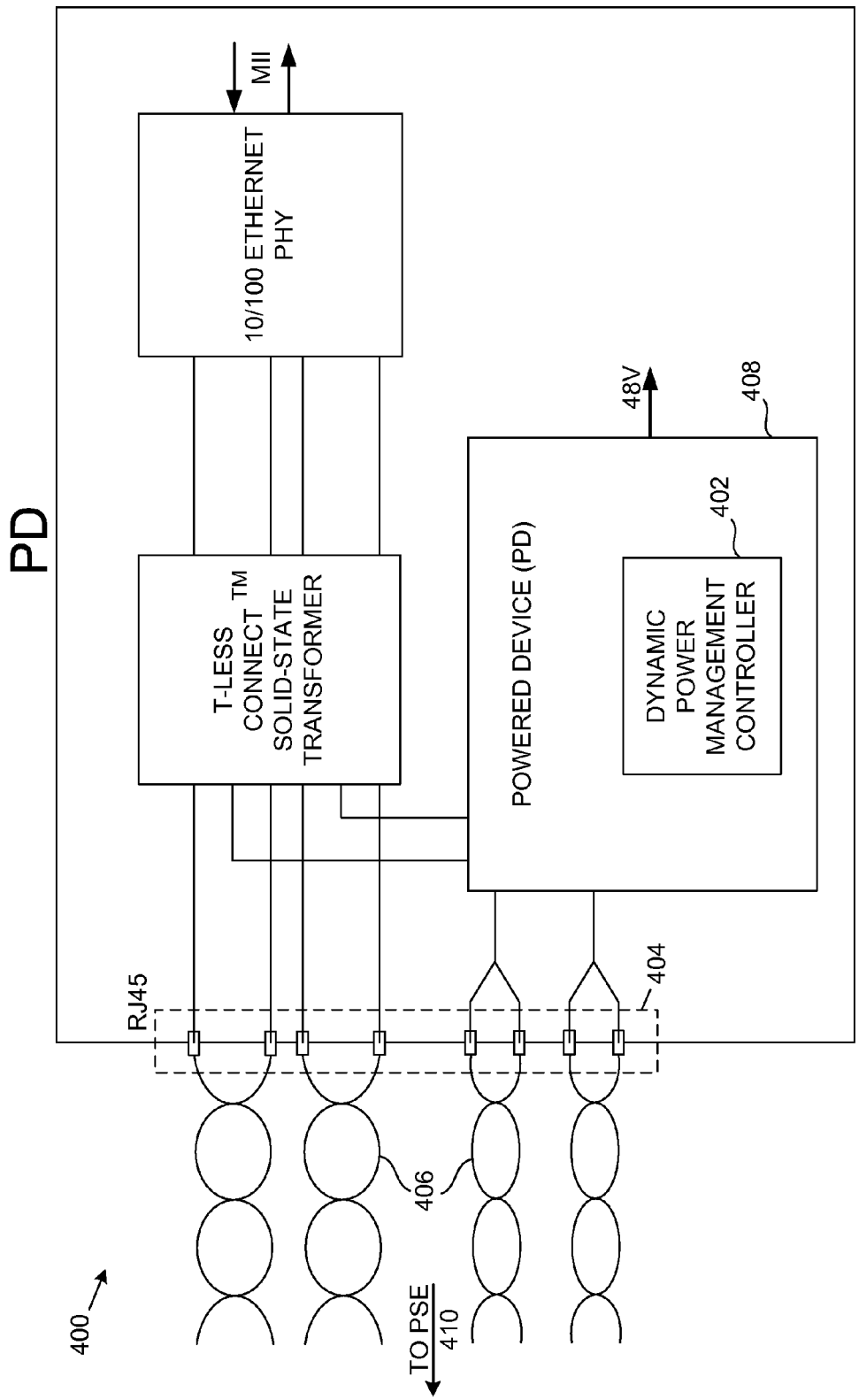

Referring to FIGS. 4A and 4B, schematic block and circuit diagrams depict embodiments of network devices 400 adapted for dynamic power management in a Power-over-Ethernet application in association with a Powered Device (PD) 408. The illustrative network device 400 comprises a dynamic power management (DPM) controller 402 adapted for coupling to a network connector 404 that connects to a network cable 406 in a configuration that transfers power and communication signals to a Powered Device (PD) 408. The dynamic power management controller 402 can transmit power management information over the network cable 406 at a Transmission Control Protocol/Internet Protocol (TCP/IP) layer and/or a Media Access Control (MAC) layer.

The powered end station for the PD shown in FIG. 4A has a magnetic transformer coupling. The powered end station for the PD shown in FIG. 4B includes a T-Less Connect™ solid-state transformer.

In some embodiments or applications, the dynamic power management controller 402 can be configured to encode an Ethernet packet at the Transmission Control Protocol/Internet Protocol (TCP/IP) layer that requests a supply power level from a Power Sourcing Equipment (PSE) device 410.

Some embodiments and/or applications may comprise the dynamic power management controller 402 that can be configured to encode Type of Service (TOS) bits in a Transmission Control Protocol/Internet Protocol (TCP/IP) header of the TCP/IP layer to assign priority for traffic for statistical power management. For example, the dynamic power management controller 402 can be configured to encode an Ethernet packet at the Transmission Control Protocol/Internet Protocol (TCP/IP) layer for sending to a Power Sourcing Equipment (PSE) device 410 a request identifying at least one information item. The type of information items may include, for example, current Powered Device (PD) operating power, anticipated PD operating power, PD device identification, PD device operating information, PD device priority assignment, and other similar types of information.

Conventionally, Type of Service (TOS) bits are defined as a set of four-bit flags in the Internet Protocol (IP) header. In conventional operation, if any one of the bit flags is set, routers handle a datagram differently than datagrams that have no TOS bits set. The four bits each have a different purpose and only a single one of the TOS bits is conventionally allowed to be set at any time, disallowing combinations of set bits. Bit flags are called Type of Service bits by virtue of enabling an application that transmits data to inform a network of the type of network service needed by the application. Conventional classes of network service availability are minimum delay, maximum throughput, maximum reliability, minimum cost.

In contrast, the illustrative network device 400 extends functionality of the Type of Service (TOS) bits beyond standard or conventional operations to enable assignment of priority for traffic for statistical power management.

The dynamic power management controller 402 can also or alternatively be configured to encode 8b/10b reserved codes at the Media Access Control (MAC) layer. The 8b/10b reserved codes can request a demand-based power from a Power Sourcing Equipment (PSE) device 410.

The dynamic power management controller 402 can further be configured to incorporate static power management by sending detection and classification information in a plurality of phases and a plurality of cycles at a physical layer from the Powered Device (PD) 408 to a Power Sourcing Equipment (PSE) 410.

Figure 5A:
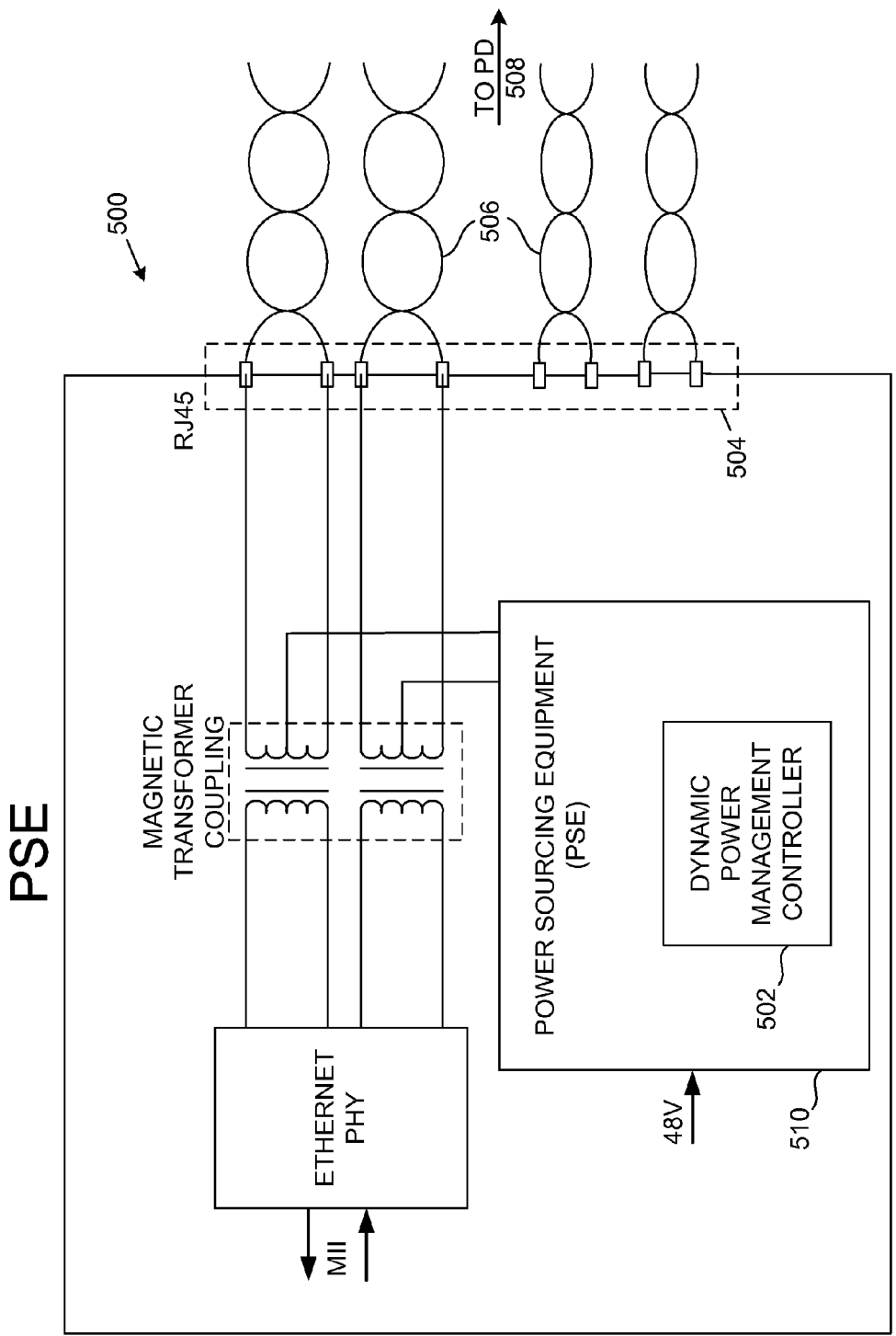
FIGS. 5A, 5B, and 5C are schematic block and circuit diagrams illustrating embodiments of a network device adapted for dynamic power management in a Power-over-Ethernet application in association with a Power Sourcing Equipment (PSE)
Figure 5B:
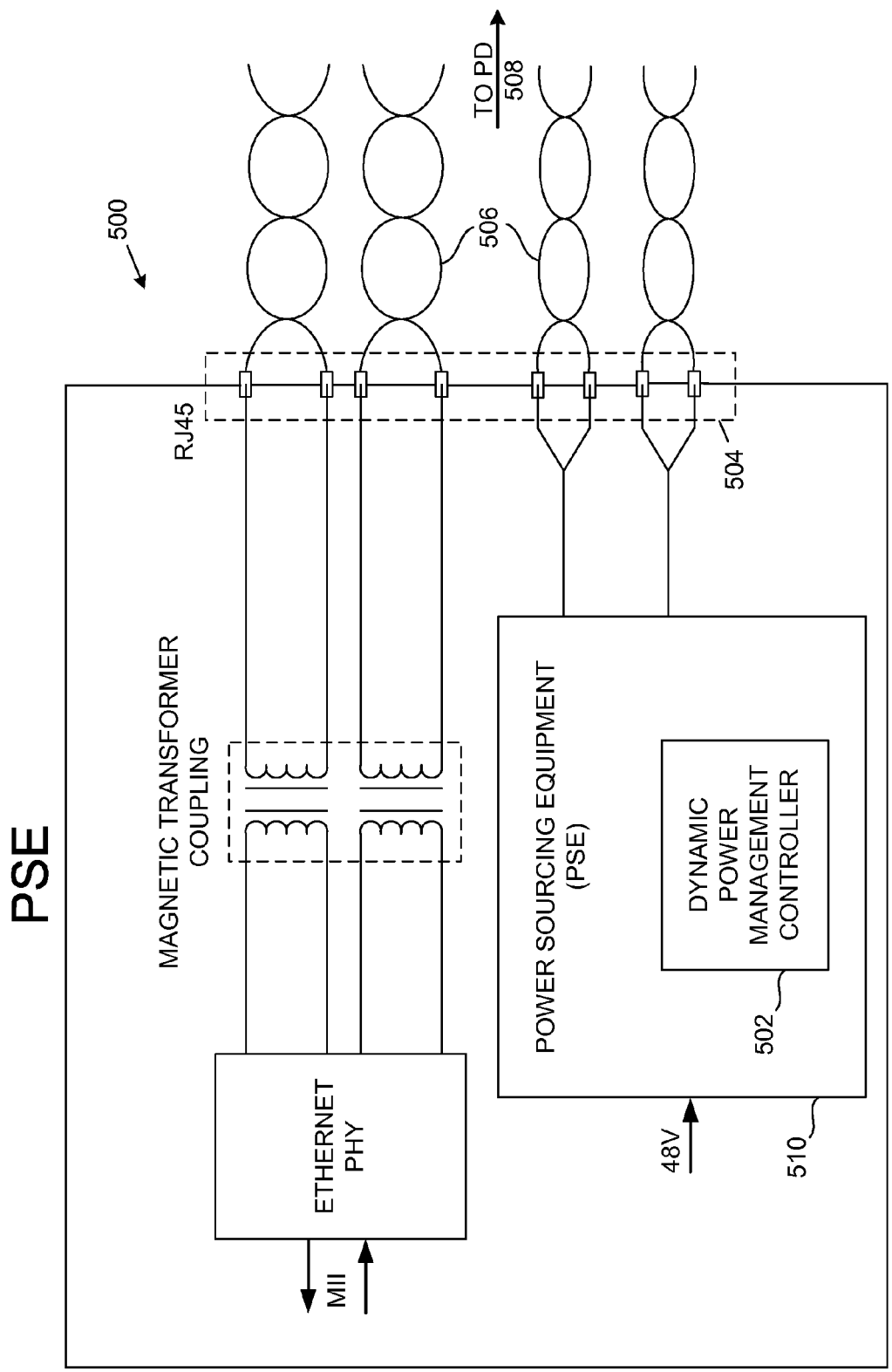
Figure 5C:
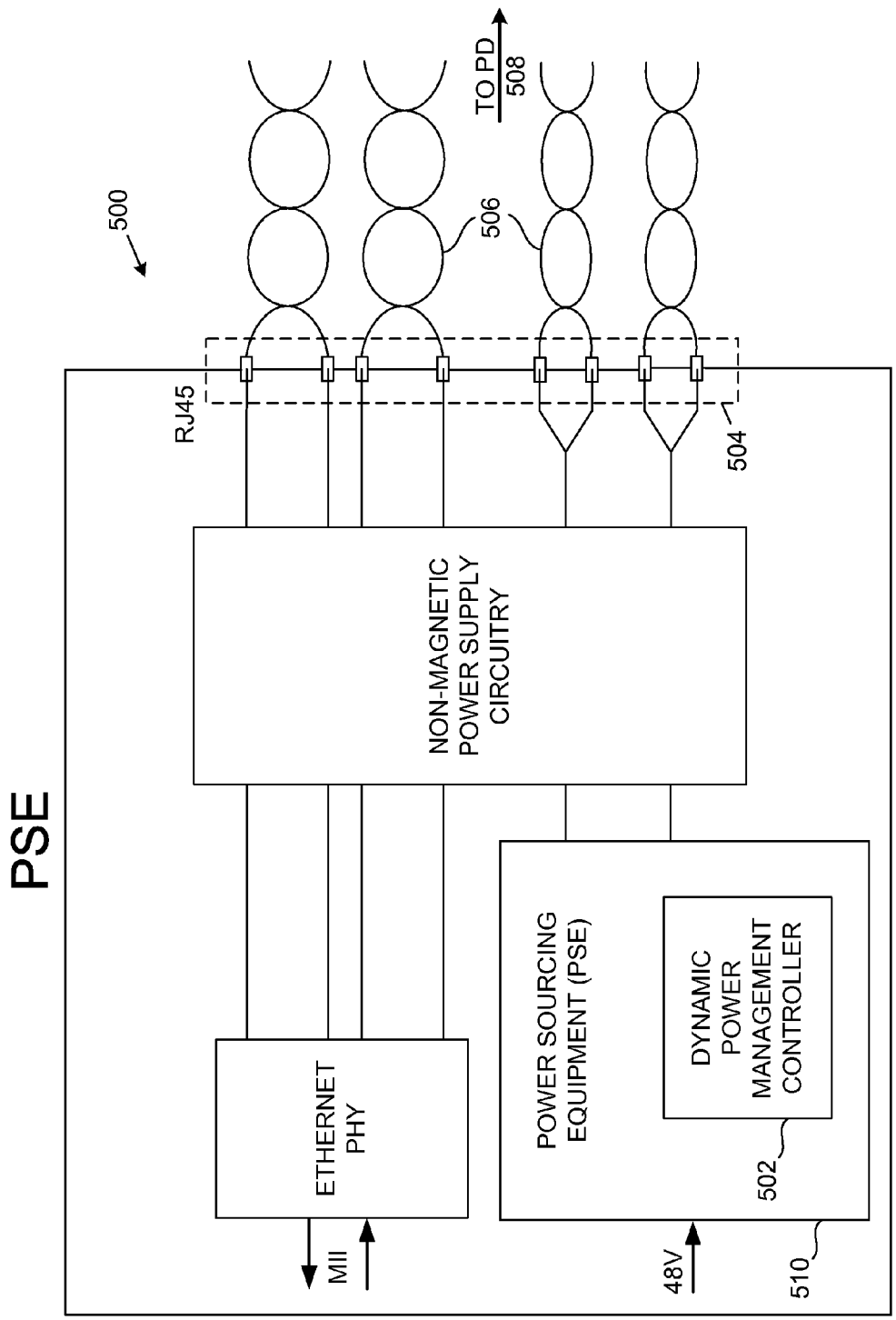

Referring to FIGS. 5A, 5B, and 5C, schematic block and circuit diagrams illustrate embodiments of network devices 500 adapted for dynamic power management in a Power-over-Ethernet application in association with a Power Sourcing Equipment (PSE) 510. The network device 500 comprises a dynamic power management controller 502 adapted for coupling to a network connector 504 that connects to a network cable 506 in a configuration that sends power from a Power Sourcing Equipment (PSE) 510 and communicates signals between the PSE 510 and a Powered Device (PD) 508. The dynamic power management controller 502 is configured to communicate power management information over the network cable 506 at a Transmission Control Protocol/Internet Protocol (TCP/IP) layer and/or a Media Access Control (MAC) layer.

In some implementations, the dynamic power management controller 502 can be configured to decode an Ethernet packet at the Transmission Control Protocol/Internet Protocol (TCP/IP) layer received at the Power Sourcing Equipment (PSE) 510 and to transmit power from the PSE 510 to the requesting Powered Device (PD) 508 at a supply power level according to the decoded packet.

FIGS. 5A and 5B show power sourcing switches for Power-over-Ethernet devices using traditional power sourcing alternatives via a magnetic transformer coupling wherein power is transmitted over existing data-signal wire pairs and power is supplied through spare wires of a typical CAT-5 cable, respectively. The switch for a Power Souring Equipment (PSE) shown in FIG. 5C includes non-magnetic power supply circuitry, such as a T-Less Connect™ solid-state transformer.

Various embodiments or applications of the dynamic power management controller 502 can also or alternatively be configured to decode Type of Service (TOS) bits in a Transmission Control Protocol/Internet Protocol (TCP/IP) header of the TCP/IP layer and enforce priority for traffic to one or more requesting Powered Devices (PDs) 508 using statistical power management.

Also at the TCP/IP layer, the dynamic power management controller 502 can be configured to decode an Ethernet packet at the Transmission Control Protocol/Internet Protocol (TCP/IP) layer received at the Power Sourcing Equipment (PSE) 510 and to transmit power from the PSE 510 to the requesting Powered Device (PD) 508 at a supply power level according to one or more information items in the decoded packet. Various information items can be one or more of current Powered Device (PD) operating power, anticipated PD operating power, PD device identification, PD device operating information, PD device priority assignment, or other similar parameters.

The dynamic power management controller 502 in various embodiments and/or implementations can manage power at the Media Access Control (MAC) layer either in place of or in addition to management at the TCP/IP layer. At the MAC layer, the dynamic power management controller 502 can be configured to decode 8b/10b reserved codes at the Media Access Control (MAC) layer received at the Power Sourcing Equipment (PSE) 510 and to transmit demand-based power from the PSE 510 to the requesting Powered Device (PD) 508 at a supply power level according to the decoded reserved codes.

In further embodiments or applications, the dynamic power management controller 502 can further be configured to combine static and dynamic power management by receiving classification information in multiple phases and multiple cycles at a physical layer at the Power Sourcing Equipment (PSE) detection 510 that is transmitted from the Powered Device (PD) 510. The PSE 510 can respond by sending operational information from the PSE 510 to the PD 508 at the physical layer.

Figure 6A:
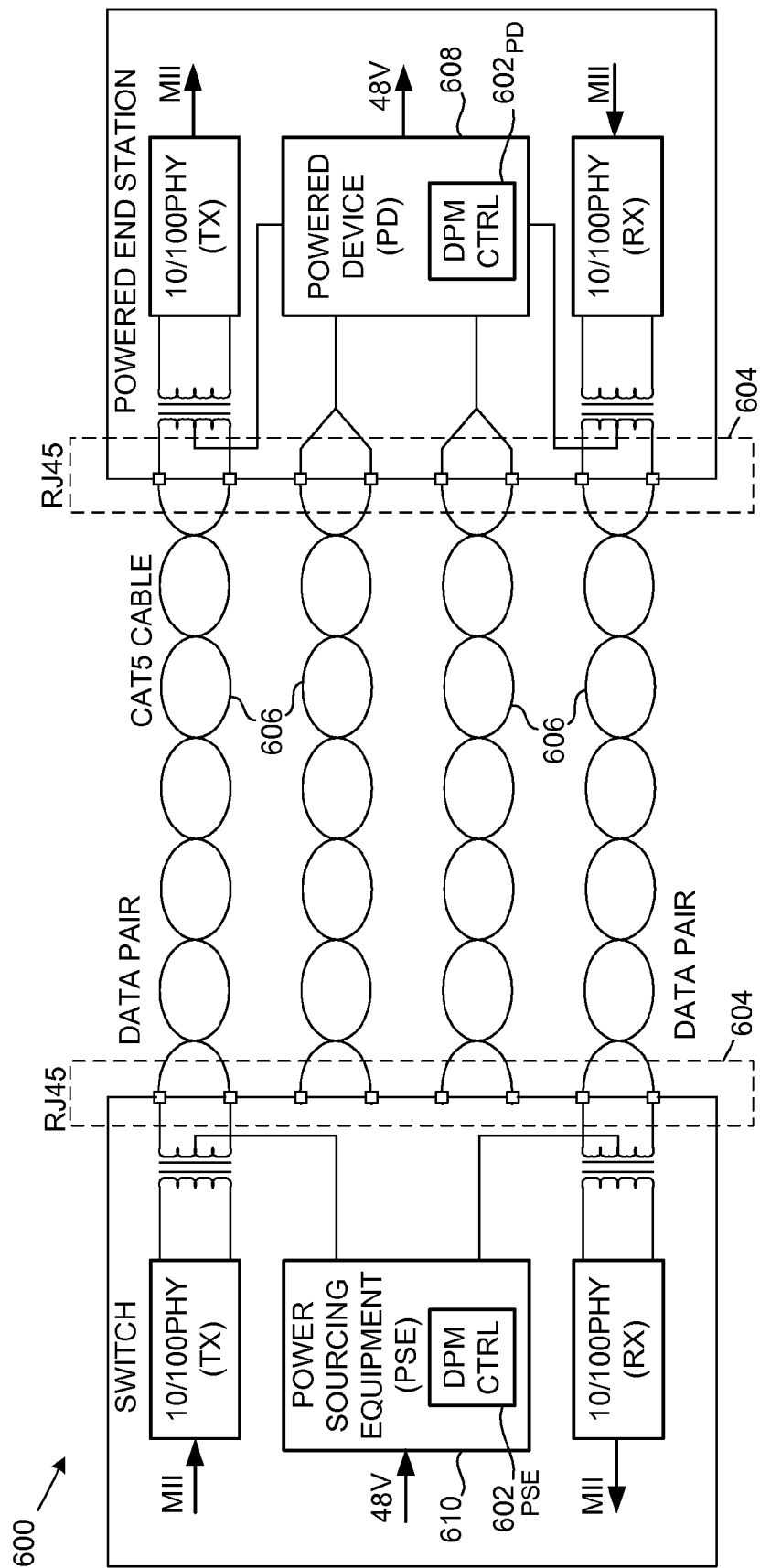
FIGS. 6A and 6B are schematic block diagrams that show embodiments of network systems adapted for dynamic power management in a Power-over-Ethernet application.
Figure 6B:
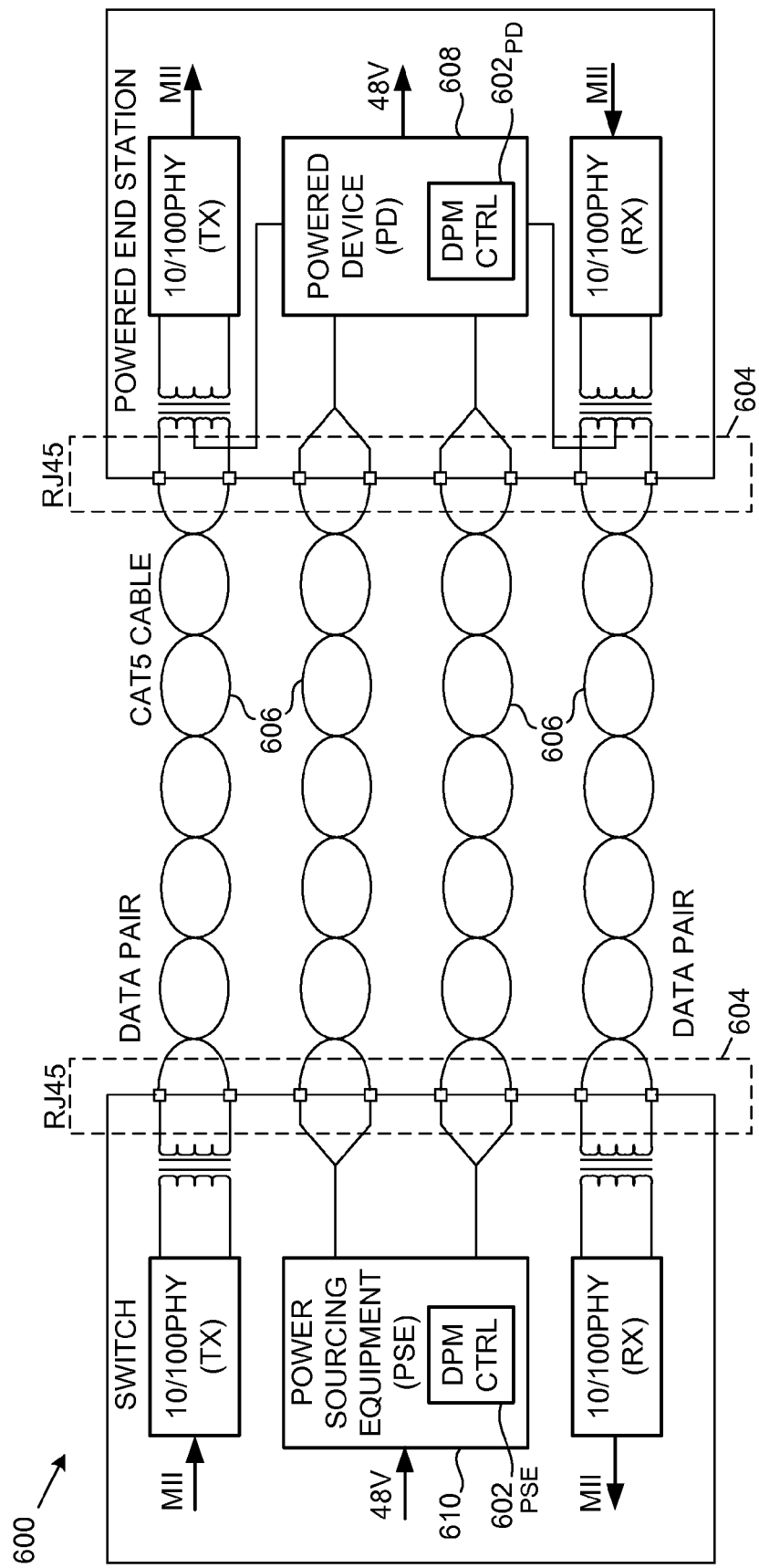

Referring to FIGS. 6A and 6B, schematic block diagrams show embodiments of network systems 600 adapted for dynamic power management in a Power-over-Ethernet application. The network system 600 comprises dynamic power management controllers $602_{PSE}$ and $602_{PD}$ respectively configured for usage in a Power Sourcing Equipment (PSE) 610 and a Powered Device (PD) 608 coupled by a network cable 606 in a configuration that transfers power and communication signals from the PSE 610 to the PD 608. The dynamic power management controllers $602_{PSE}$ and $602_{PD}$ is configured to communicate power management information over the network cable 606 at a Transmission Control Protocol/Internet Protocol (TCP/IP) layer and/or a Media Access Control (MAC) layer.

FIGS. 6A and 6B show network systems using traditional power sourcing alternatives via a magnetic transformer coupling wherein power is transmitted over existing data-signal wire pairs and power is supplied through spare wires of a typical CAT-5 cable, respectively. In other embodiments, the magnetic transformers can be replaced with non-magnetic power supply circuitry, such as a T-Less Connect™ solid-state transformer.

At the Transmission Control Protocol/Internet Protocol (TCP/IP) layer, a dynamic power management controller $602_{PD}$ at the Powered Device (PD) 608 can be configured to encode and send an Ethernet packet at the TCP/IP layer that requests a supply power level from a Power Sourcing Equipment (PSE) device 610. The dynamic power management controller $602_{PSE}$ at the PSE 610 can be configured to receive and decode the Ethernet packet and to transmit power from the PSE 610 to the requesting PD 608 at a supply power level as directed by the decoded packet.

In some embodiments, the network system 600 can operate in the Transmission Control Protocol/Internet Protocol (TCP/IP) layer whereby a dynamic power management controller $602_{PD}$ at the Powered Device (PD) 608 can be configured to encode and send Type of Service (TOS) bits in a TCP/IP header of the TCP/IP layer to assign priority for traffic for statistical power management. The dynamic power management controller $602_{PSE}$ at the Power Sourcing Equipment (PSE) 610 can be configured to receive and decode the Type of Service (TOS) bits and enforce priority for traffic to one or more requesting Powered Devices (PD) 608 using statistical power management.

In various embodiments of the network system 600, a dynamic power management controller $602_{PD}$ at the Powered Device (PD) 608 can be configured to encode an Ethernet packet at the Transmission Control Protocol/Internet Protocol (TCP/IP) layer and send the Ethernet packet to a Power Sourcing Equipment (PSE) device 610 a request identifying one or more information items such as current PD operating power, anticipated PD operating power, PD device identification, PD device operating information, PD device priority assignment, and others. A dynamic power management controller $602_{PSE}$ at the PSE 610 can decode the Ethernet packet and transmit power from the PSE 610 to the requesting PD 608 at a supply power level that is determined on the basis of the information item or items in the decoded Ethernet packet.

At the Media Access Control (MAC) layer, a dynamic power management controller $602_{PD}$ at the Powered Device (PD) 608 can encode and send 8b/10b reserved codes at the Media Access Control (MAC) layer that request a demand-based power from a Power Sourcing Equipment (PSE) device 610. A dynamic power management controller $602_{PSE}$ at the PSE 610 can receive and decode the 8b/10b reserved codes and transmit demand-based power from the PSE 610 to the requesting PD 608 at a supply power level as specified by the decoded reserved codes.

At the physical layer, some embodiments of a dynamic power management controller $602_{PD}$ at the Powered Device (PD) 608 can also send detection and classification information in multiple phases and cycles at the physical layer to the Power Sourcing Equipment (PSE) 610. A dynamic power management controller $602_{PSE}$ at the PSE 610 can further configured to receive the detection and classification information and send operational information from the PSE 610 to the PD 608 at the physical layer.

Figure 8:
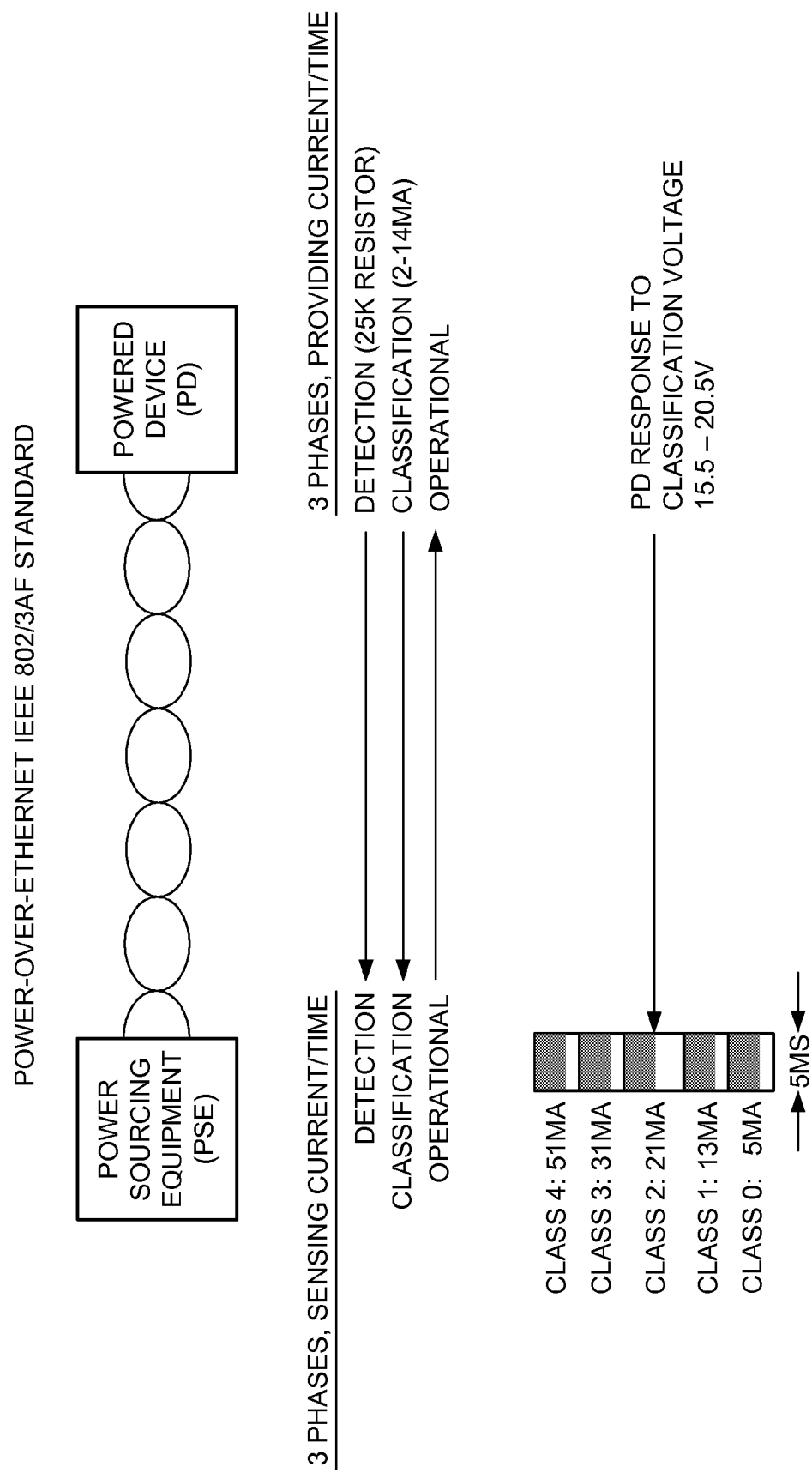
FIG. 8 is a block diagram illustrating traditional classification levels for a Power over Ethernet application of the IEEE 802.3af standard.

Referring to FIG. 8, a block diagram illustrates traditional classification levels for a Power over Ethernet application of the IEEE 802.3af standard. The IEEE 802.3af standard defines classification for interactions between a Power Sourcing Equipment (PSE) and a Powered Device (PD). The PD supplies current/time in three phases for communicating detection via a 25 KΩ resistor and classification via a current from 2-14 milliamps. Classification, for example power demand classification, specifies the power demand for the PD, which may vary according to time and/or conditions. Detection indicates presence of the PD. The PSE senses current/time in three phases for sensing detection and classification of the PD and returns operational signals to the PD.

The IEEE 802.3af standard classes 0 through 4 are shown along with the PD response to Classification voltage in a range from 15.5 to 20.5 volts. The power sourcing equipment (PSE) raises the voltage to about 15.5 to 20.5V and the PD receives the signal in the range and sends out a current depending on the desired classification. The PSE identifies the classification range, responds with verification if appropriate and enters the selected operational mode in the IEEE 802.3af process for setting classification levels.

Figure 9:
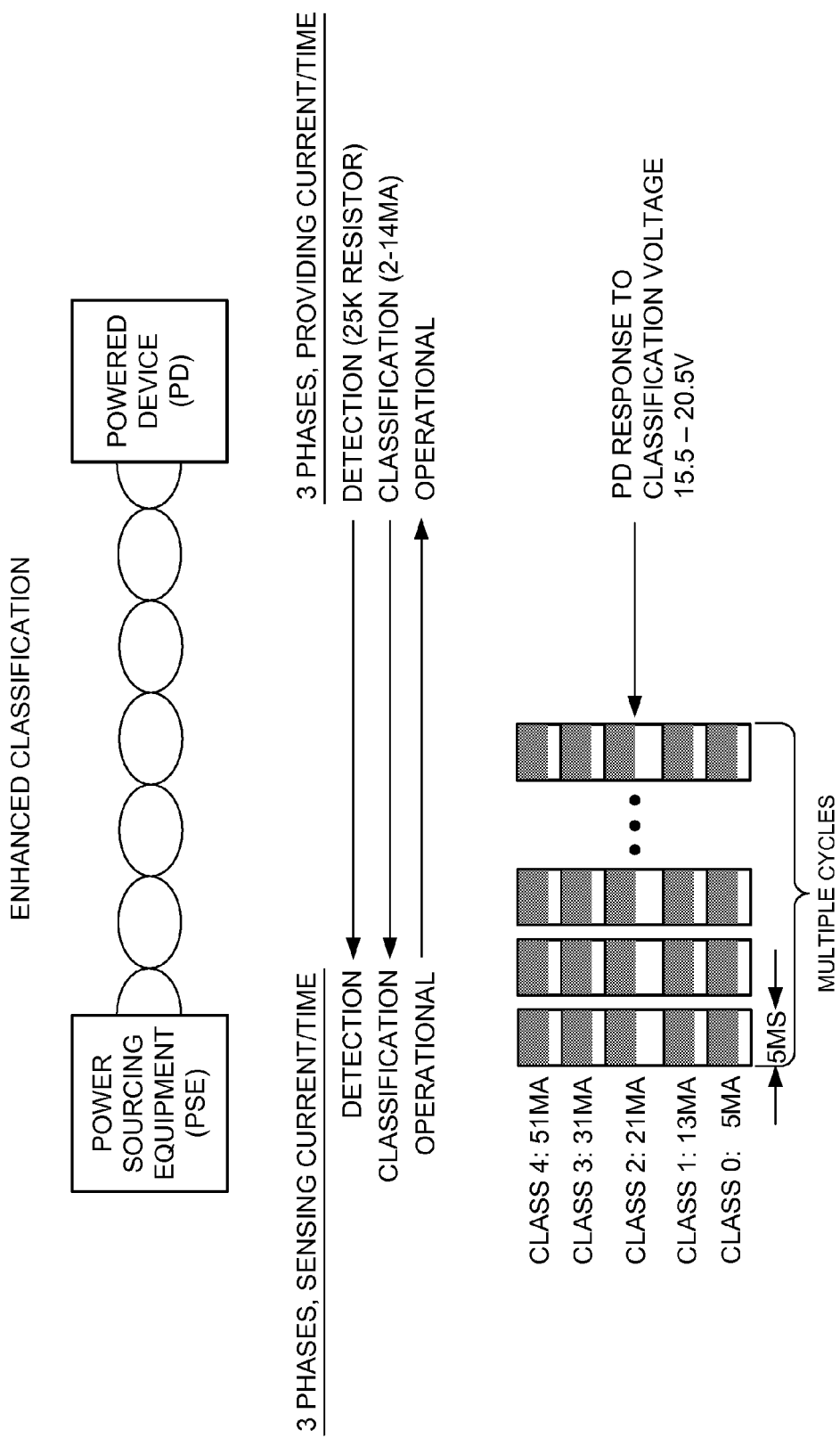
FIG. 9 is a block diagram illustrating an enhanced classification scheme.

The dynamic power management controllers $602_{PD}$ and $602_{PSE}$ can implement an enhanced classification scheme whereby classification can be extended to multiple cycles. For example, as shown in the block diagram of FIG. 9 the levels defined using traditional IEEE 802.3af classification can be repeated a selected number N times to enable encoding of more information. Each classification cycle specifies four levels, supporting $4^N$ different classifications. The handshake scheme of IEEE 02.3af classification remains the same whereby the PD learns the PSE type and the PSE learns the PD type. The multiple cycle operation and coding scheme avoids misidentification and enables a large number and expansion of classes.

In some embodiments, for example the illustrative embodiment, the Powered Device (PD) 608 and the Power Sourcing Equipment (PSE) 610 can be configured for Power-over-Ethernet (PoE) operation.

Figure 7A:
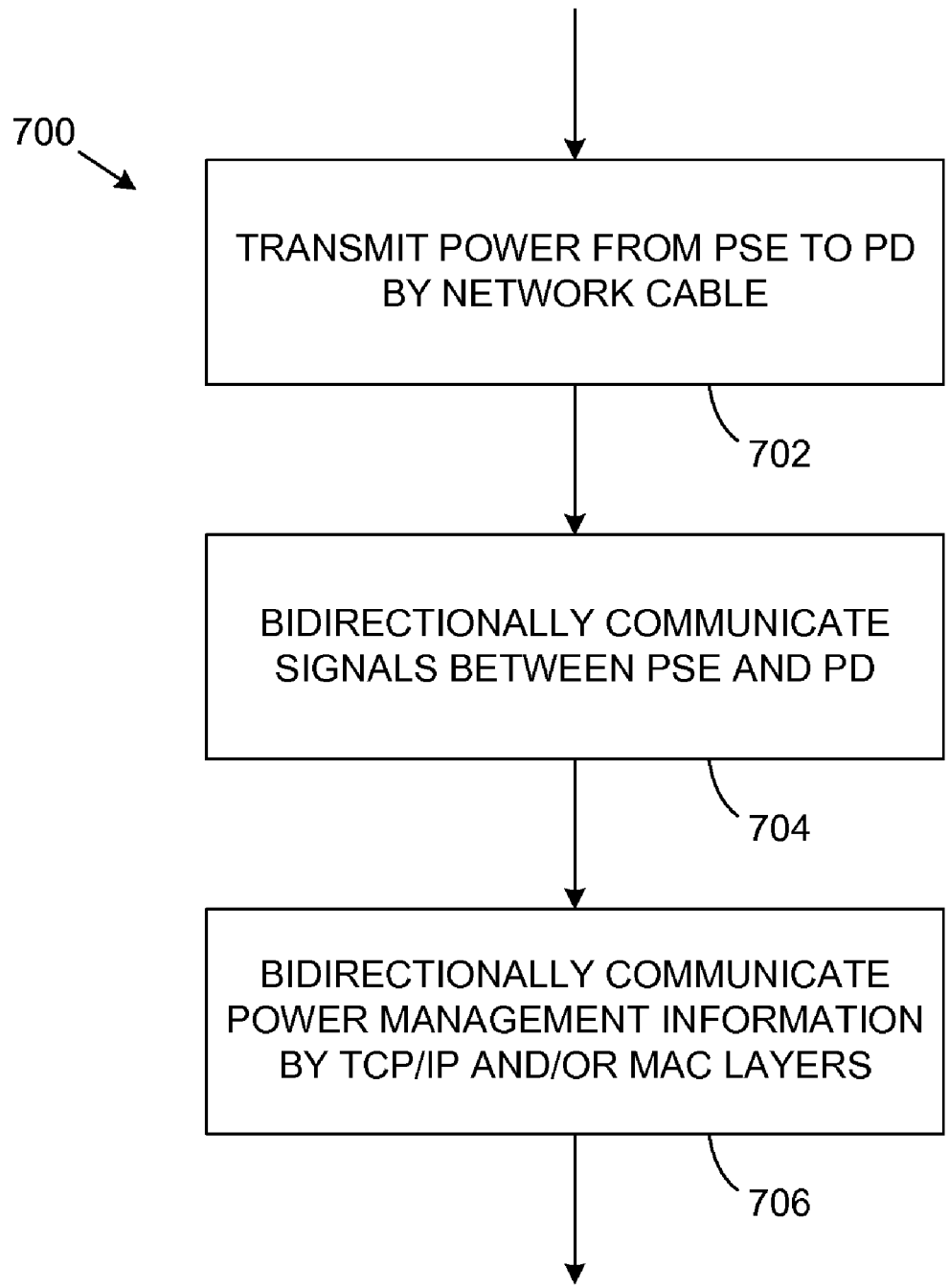
FIGS. 7A through 7F are flow charts that depict embodiments of power management methods that can be used in a Power-over-Ethernet application.

Referring to FIG. 7A, a flow chart depicts an embodiment of a power management method 700 that can be used in a Power-over-Ethernet application. The power management method 700 comprises transmitting 702 power from a Power Sourcing Equipment (PSE) to a Powered Device (PD) via a network cable. Signals are communicated 704 bidirectionally between the PSE and the PD via the network cable. Power management information is also bidirectionally communicated 706 over the network cable at a Transmission Control Protocol/Internet Protocol (TCP/IP) layer and/or a Media Access Control (MAC) layer.

Figure 7B:
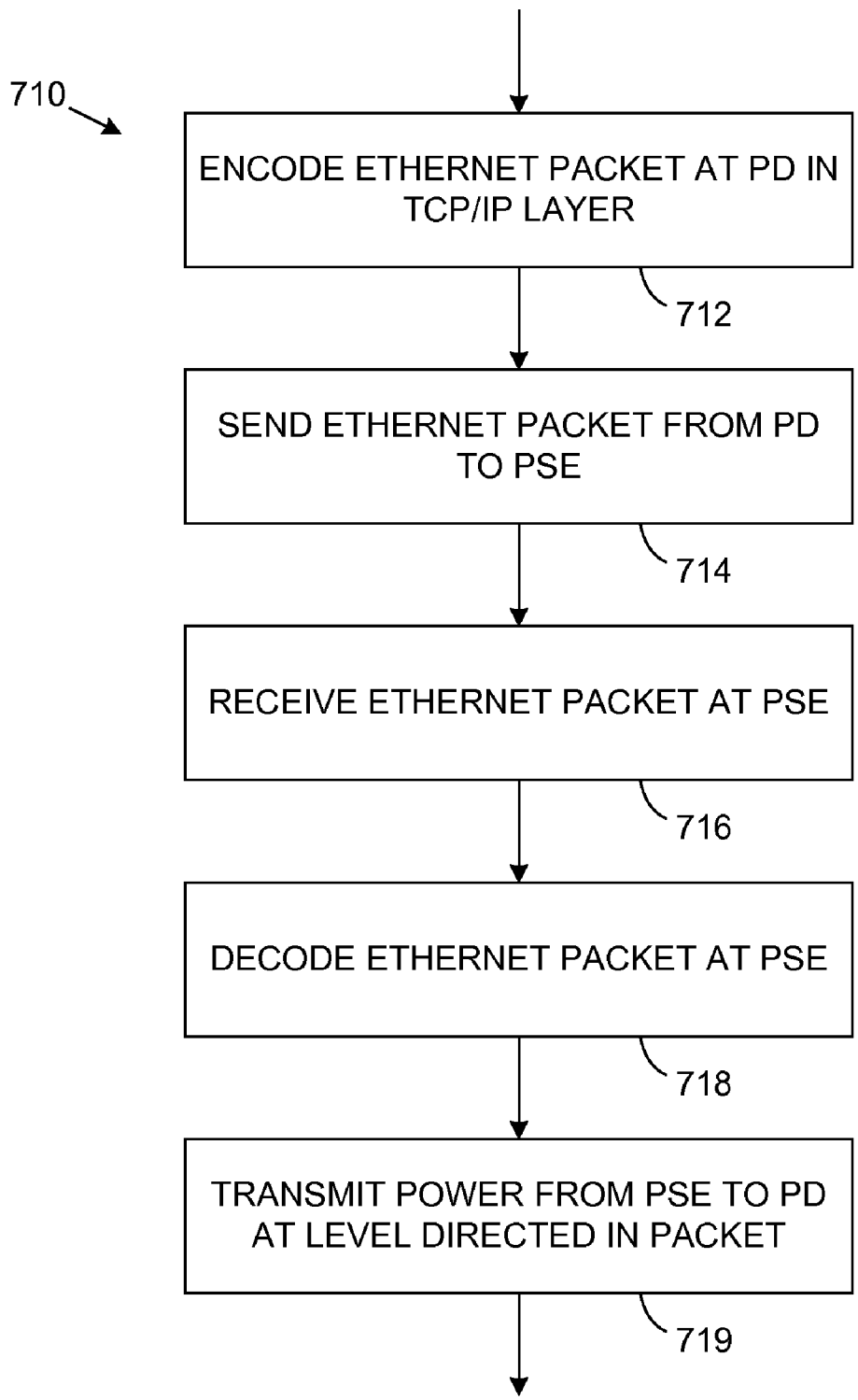

Referring to FIG. 7B, a flow chart illustrates a particular embodiment of a power management method 710 for application in the Transmission Control Protocol/Internet Protocol (TCP/IP) layer. At the Powered Device (PD) an Ethernet packet is encoded 712 at the TCP/IP layer that requests a supply power level from a Power Sourcing Equipment (PSE) device. The Ethernet packet is sent 714 from the PD to the PSE and the PSE receives 716 the Ethernet packet. The PSE decodes 718 the Ethernet packet and transmits 719 power from the PSE to the requesting PD at a supply power level according to the decoded packet.

Figure 7C:
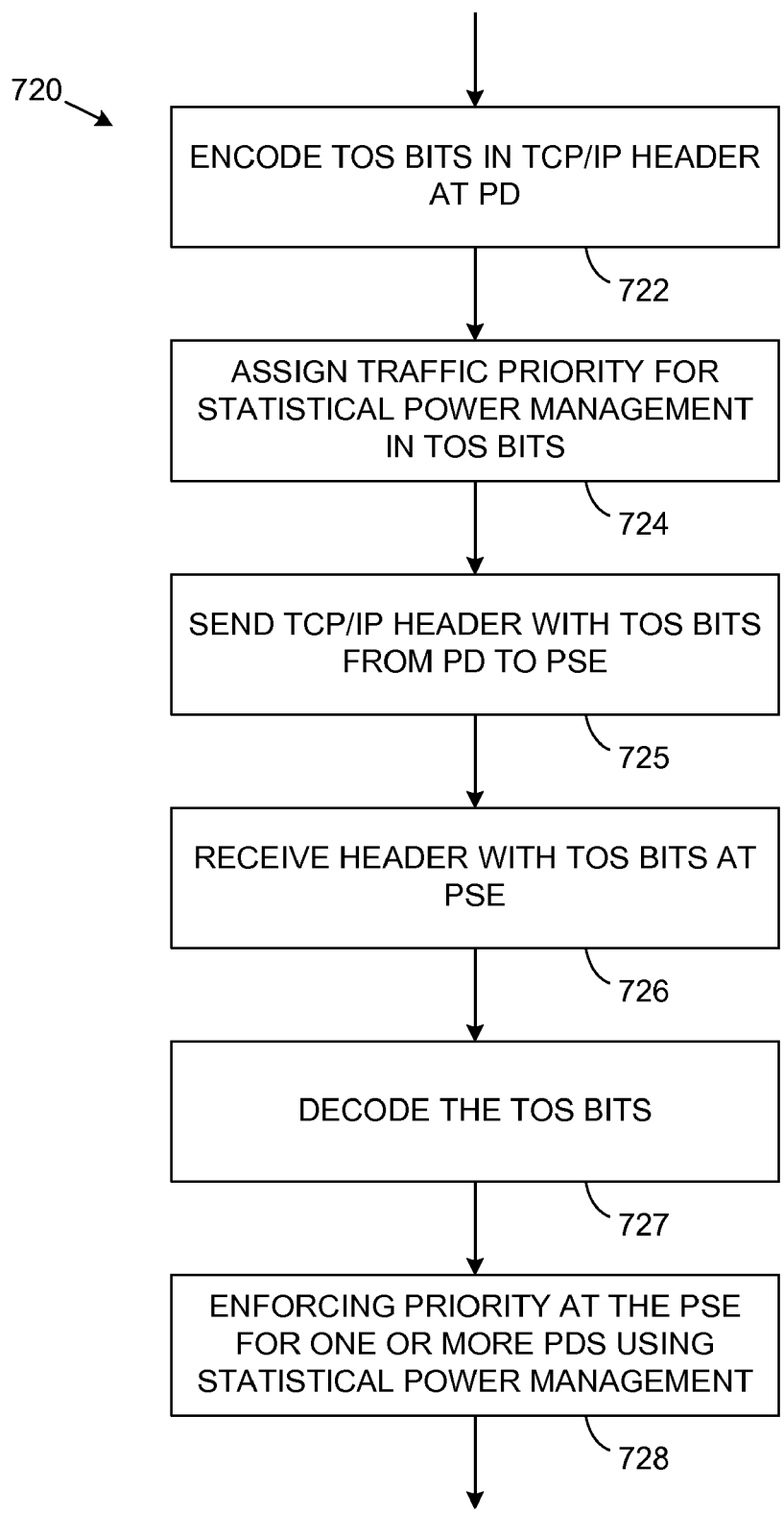

FIG. 7C is a flow chart showing another embodiment of a power management method 720 that also communicates via the TCP/IP layer. In the illustrative power management method 720, the Powered Device (PD) encodes 722 Type of Service (TOS) bits in a Transmission Control Protocol/Internet Protocol (TCP/IP) header of the TCP/IP layer to assign 724 traffic priority for statistical power management. The PD sends 725 the TCP/IP header with encoded TOS bits to the PSE. The PSE receives 726 the TCP/IP header with the encoded TOS bits at the PSE and decodes 727 the TOS bits. The PSE enforces 728 priority for traffic to one or more requesting PDs using statistical power management.

Figure 7D:
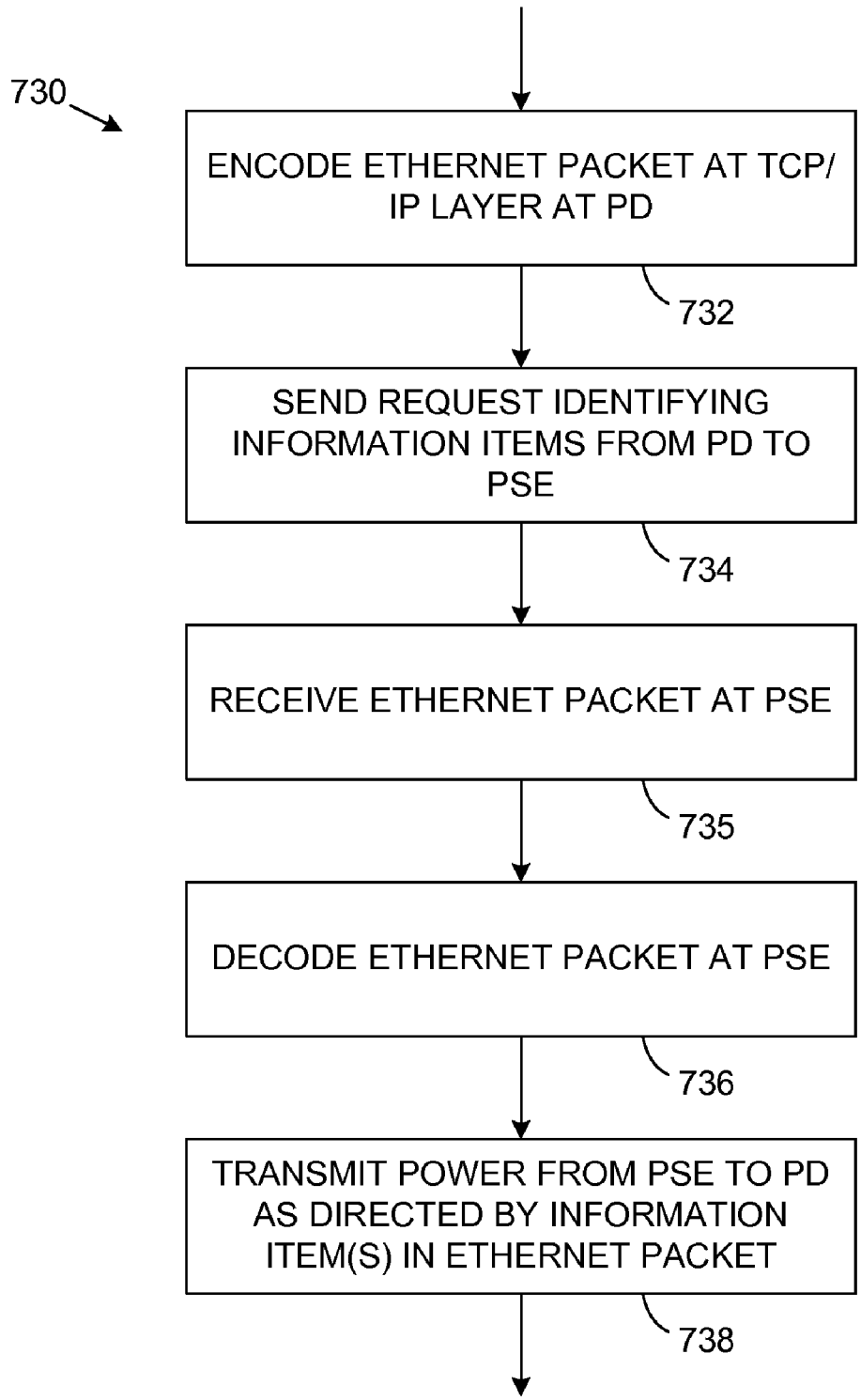

Referring to FIG. 7D, a flow chart illustrates a further embodiment of a power management method 730 that also communicates via the TCP/IP layer. In the illustrative power management method 730, a Powered Device (PD) encodes 732 an Ethernet packet at the Transmission Control Protocol/Internet Protocol (TCP/IP) layer and sends 734 a request identifying one or more information items in the Ethernet packet to a Power Sourcing Equipment (PSE) device. The information items may include one or more of current PD operating power, anticipated PD operating power, PD device identification, PD device operating information, PD device priority assignment, or the like. The PSE receives 735 and decodes 736 the Ethernet packet, then transmits 738 power from the PSE to the requesting PD at a supply power level as directed by the information item or items contained in the decoded Ethernet packet.

Figure 7E:
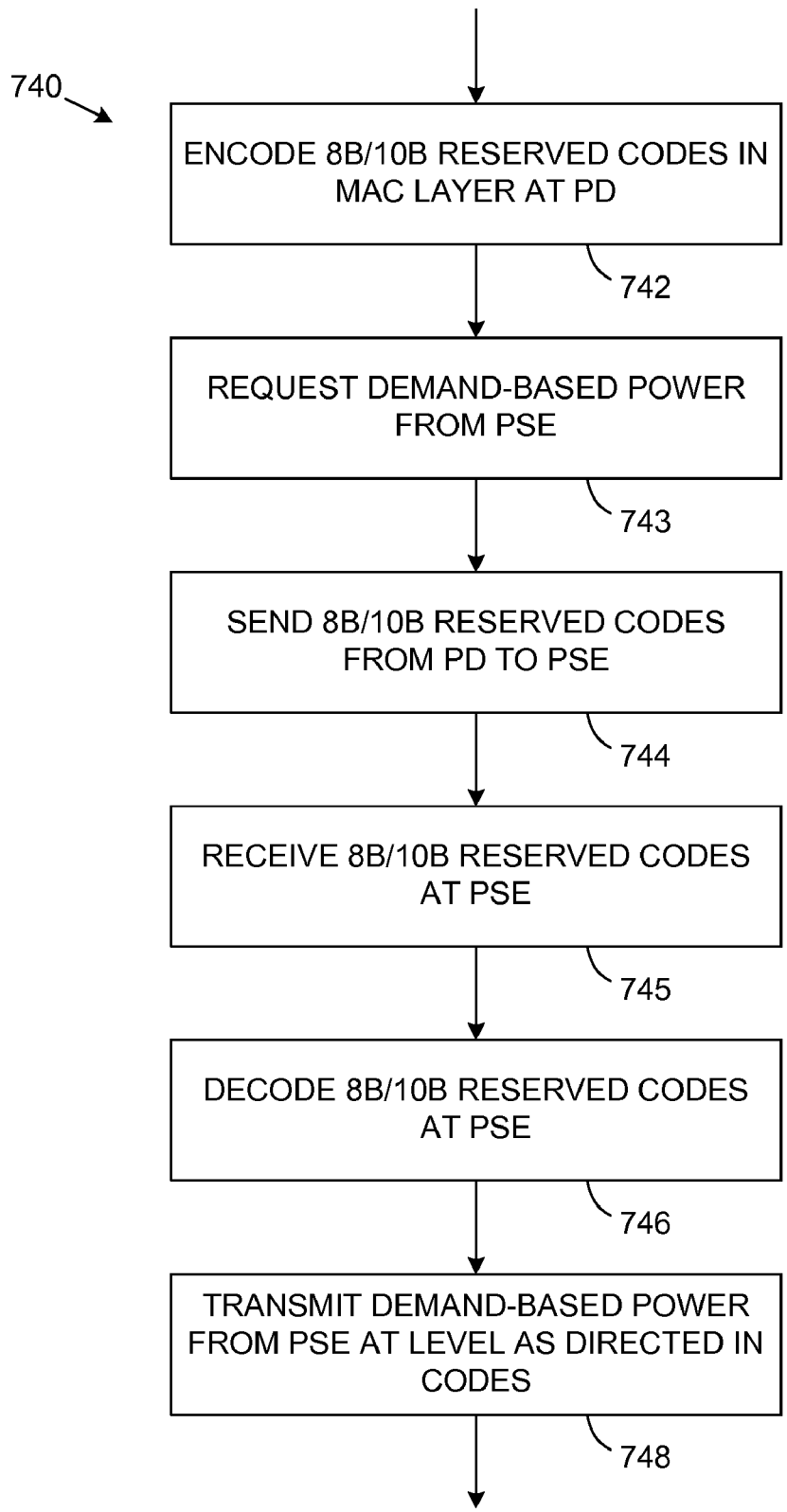

Referring to FIG. 7E, a flow chart illustrates a particular embodiment of a power management method 740 for application in the Media Access Control (MAC) layer. A Powered Device (PD) encodes 742 8b/10b reserved codes at the Media Access Control (MAC) layer that request 743 a demand-based power from a Power Sourcing Equipment (PSE) device, then sends 744 the 8b/10b reserved codes from the PD to the PSE. A PSE receives 745 and decodes 746 the 8b/10b reserved codes, then transmits 748 demand-based power from the PSE to the requesting PD at a supply power level as directed according to the decoded reserved codes.

Figure 7F:
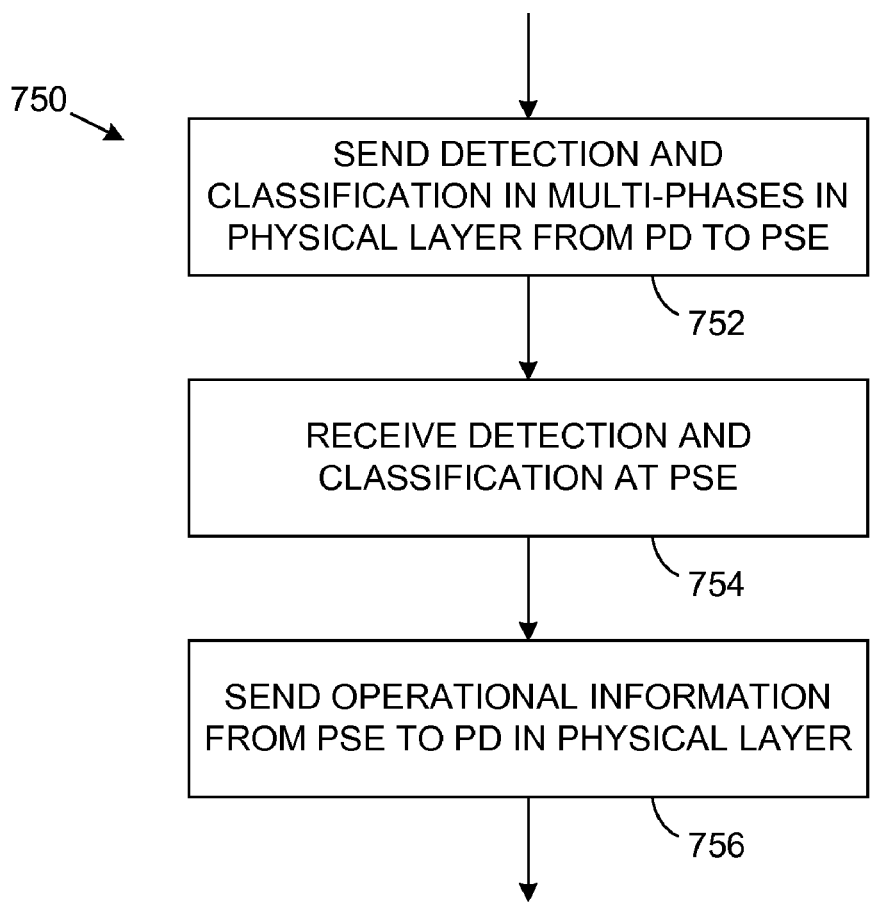

In some embodiments, in addition to the dynamic power management in the MAC layer and/or the TCP/IP layer the power management method can further be operative in the physical layer which implements static power management. FIG. 7F is a schematic flow chart showing a power management method 750 that further operates in the physical layer. The power management method 750 further comprises sending 752 detection and classification information in multiple phases and multiple cycles at a physical layer from the Powered Device (PD) to the Power Sourcing Equipment (PSE). The detection and classification information is received 754 at the PSE. The PSE sends 756 operational information from the PSE to the PD at the physical layer.

The illustrative dynamic power management technique enables a wide variety of power allocation beyond the four levels of classification supported in standard IEEE 802.3 usage, and enables dynamic management without requiring a link to be terminated and restarted.

Dynamic power management also enables increases in demand of powered devices. Current standards support power at a defined level, for example 13 watts per port, while future standards may enable much higher power, such as 30 to 60 watts per port or likely higher power levels in the more extended future. For illustrative purposes, a system may include PDs that usually use 4 watts of power but occasionally use 13 watts. A static system would set power requirements to cover the maximum power level so that a ten port system with each port having a maximum power level of 13 watts would use a power supply sufficient for 130 watts.

Static power management may be tolerable for a maximum power of 13 watts per port. However, the new standard with 30 to 60 watts per port and 24 to 48 ports requires a very large power supply.

Dynamic power management enables higher demand devices in combinations with a large number of ports while using a power supply of reasonable size. Dynamic power management enables usage of a smaller power supply since, for average conditions, the maximum requirement need not be sourced. In conditions that demand of the PDs exceeds the size of the power source, the dynamic power management controller can insert a delay to extend the power demand spike over a selected time interval.

An illustrative design technique may supply sufficient power to support all ports at the average plus additional supply capacity to enable a sufficient number of ports to operate at full power. Communication between PSE and PD can be used to select a suitable power level for each port.

The dynamic power management system can prioritize allocation of power among ports in the event of a conflict and communicate information between PSEs and PDs to implement the allocation. For example in one priority scheme, the PSE is may manage 48 volts and all PDs send a request to increase power. With the Ethernet protocol an acknowledge (ACK) signal may be sent that indicates an inability to immediately increase power due to the current priority of allocation. In one scheme, the user PDs may define which devices have priority. Another scheme defines a TCP/IP frame with a Type of Service (TOS) bit which defines priority over network bandwidth to drop packets in congestive conditions. A packet with the lowest priority is dropped first. The same TOS priority scheme can be used so that if a power request exceeds the power supply then the lowest priority packet is dropped first. Accordingly, traffic can be maximized since if packets are dropped in a communication between PSE and PD, supply of power to the PD is likely superfluous.

The IEEE 802.3 Ethernet Standard, which is incorporated herein by reference, addresses loop powering of remote Ethernet devices (802.3af). Power over Ethernet (PoE) standard and other similar standards support standardization of power delivery over Ethernet network cables to power remote client devices through the network connection. The side of link that supplies power is called Powered Supply Equipment (PSE). The side of link that receives power is the Powered device (PD). Other implementations may supply power to network attached devices over alternative networks such as, for example, Home Phoneline Networking alliance (HomePNA) local area networks and other similar networks. HomePNA uses existing telephone wires to share a single network connection within a home or building. In other examples, devices may support communication of network data signals over power lines.

In various configurations described herein, a magnetic transformer of conventional systems may be eliminated while transformer functionality is maintained. Techniques enabling replacement of the transformer may be implemented in the form of integrated circuits (ICs) or discrete components.

Figure 1B:
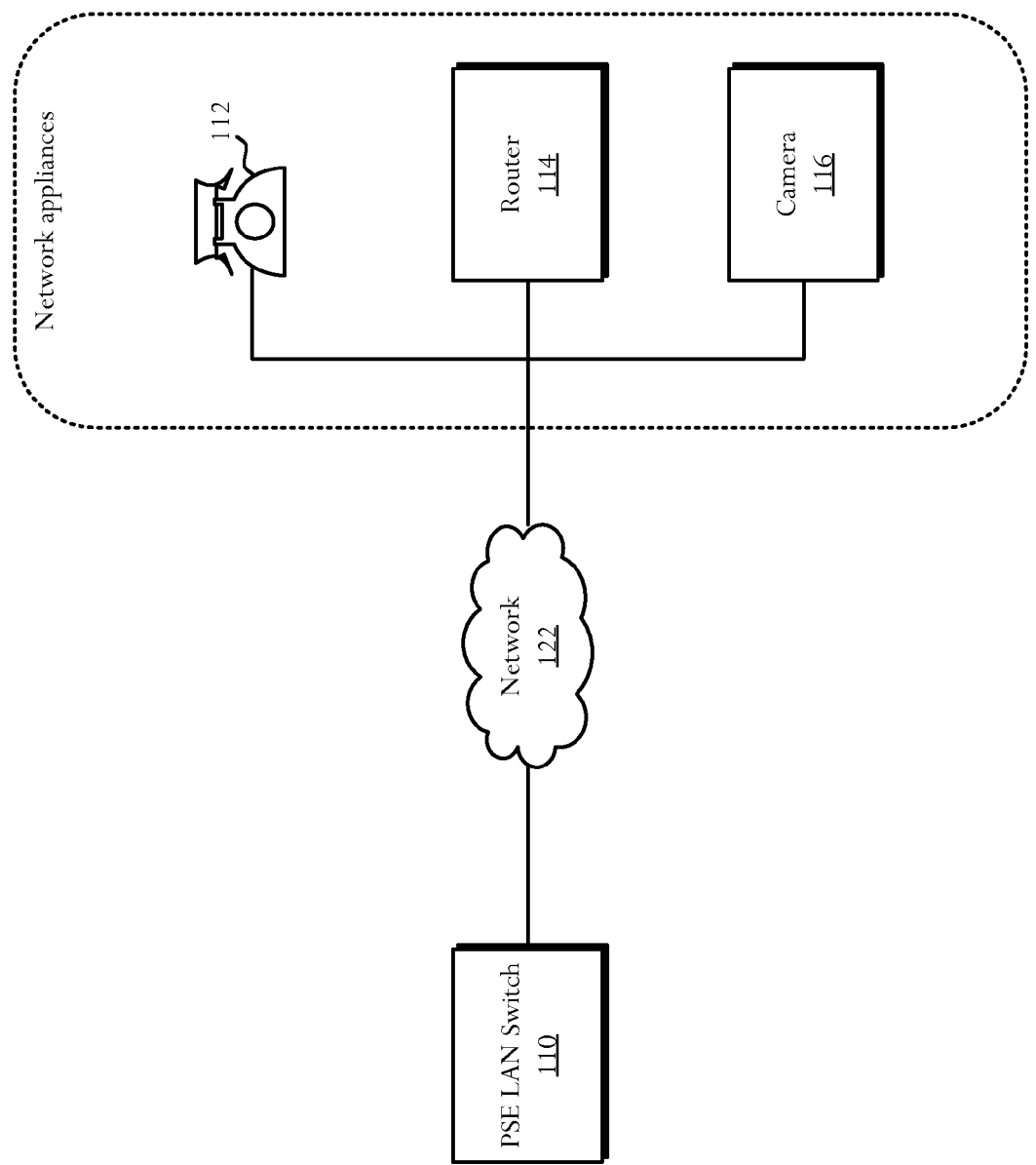

FIG. 1A is a schematic block diagram that illustrates a high level example embodiment of devices in which power is supplied separately to network attached client devices 112 through 116 that may benefit from receiving power and data via the network connection. The devices are serviced by a local area network (LAN) switch 110 for data. Individual client devices 112 through 116 have separate power connections 118 to electrical outlets 120. FIG. 1B is a schematic block diagram that depicts a high level example embodiment of devices wherein a switch 110 is a power supply equipment (PSE)-capable power-over Ethernet (PoE) enabled LAN switch that supplies both data and power signals to client devices 112 through 116. Network attached devices may include a Voice Over Internet Protocol (VOIP) telephone 112, access points, routers, gateways 114 and/or security cameras 116, as well as other known network appliances. Network supplied power enables client devices 112 through 116 to eliminate power connections 118 to electrical outlets 120 as shown in FIG. 1A. Eliminating the second connection enables the network attached device to have greater reliability when attached to the network with reduced cost and facilitated deployment.

Although the description herein may focus and describe a system and method for coupling high bandwidth data signals and power distribution between the integrated circuit and cable that uses transformer-less ICs with particular detail to the IEEE 802.3af Ethernet standard, the concepts may be applied in non-Ethernet applications and non-IEEE 802.3af applications. Also, the concepts may be applied in subsequent standards that supersede or complement the IEEE 802.3af standard.

Various embodiments of the depicted system may support solid state, and thus non-magnetic, transformer circuits operable to couple high bandwidth data signals and power signals with new mixed-signal IC technology, enabling elimination of cumbersome, real-estate intensive magnetic-based transformers.

Specific embodiments of the circuits and systems disclosed herein may be applied to various powered network attached devices or Ethernet network appliances. Such appliances include, but are not limited to VoIP telephones, routers, printers, and other similar devices.

Figure 2:
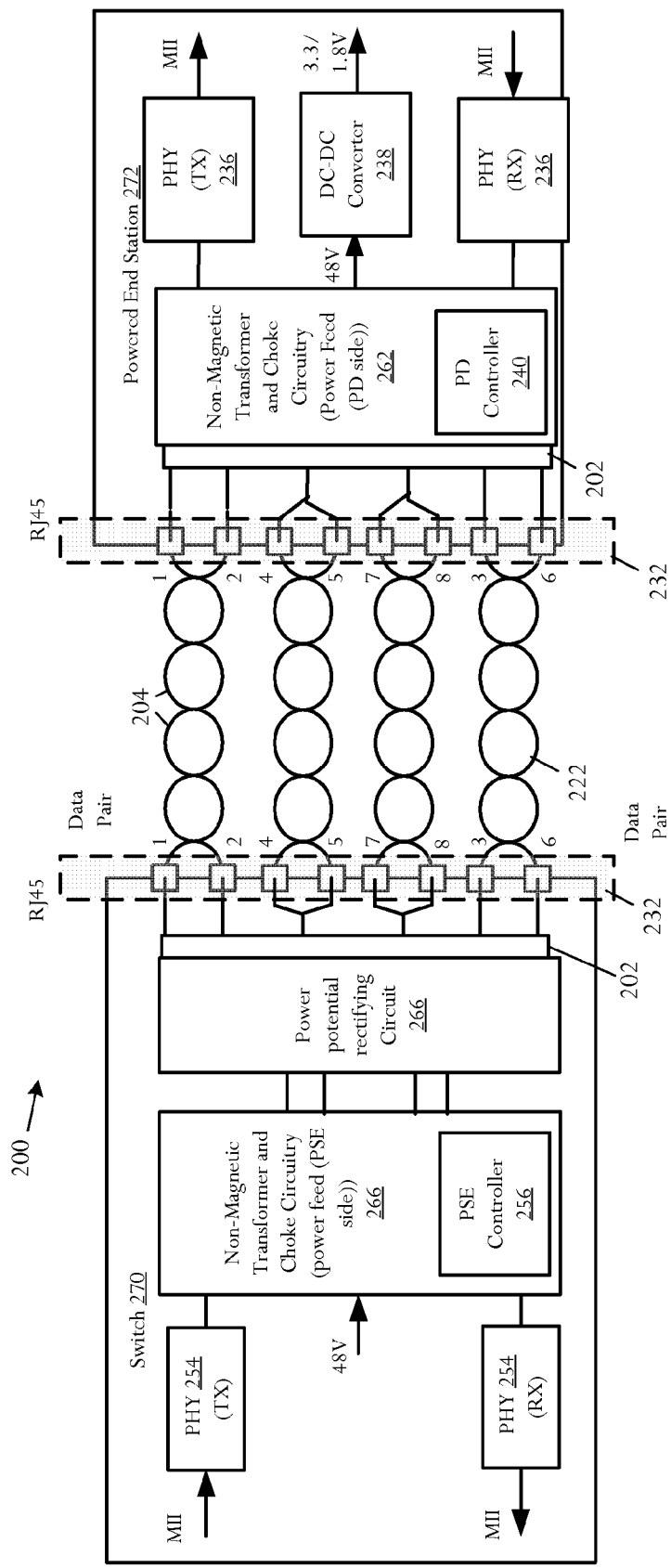
FIG. 2 is a functional block diagram illustrating a network interface including a network powered device (PD) interface and a network power supply equipment (PSE) interface, each implementing a non-magnetic transformer and choke circuitry.

Referring to FIG. 2, a functional block diagram depicts an embodiment of a network device 200 including to power potential rectification. The illustrative network device comprises a power potential rectifier 202 adapted to conductively couple a network connector 232 to an integrated circuit 270, 272 that rectifies and passes a power signal and data signal received from the network connector 232. The power potential rectifier 202 regulates a received power and/or data signal to ensure proper signal polarity is applied to the integrated circuit 270, 272.

The network device 200 is shown with the power sourcing switch 270 sourcing power through lines 1 and 2 of the network connector 232 in combination with lines 3 and 6.

In some embodiments, the power potential rectifier 202 is configured to couple directly to lines of the network connector 232 and regulate the power signal whereby the power potential rectifier 202 passes the data signal with substantially no degradation.

In some configuration embodiments, the network connector 232 receives multiple twisted pair conductors 204, for example twisted 22-26 gauge wire. Any one of a subset of the twisted pair conductors 204 can forward bias to deliver current and the power potential rectifier 202 can forward bias a return current path via a remaining conductor of the subset.

FIG. 2 illustrates the network interface 200 including a network powered device (PD) interface and a network power supply equipment (PSE) interface, each implementing a non-magnetic transformer and choke circuitry. A powered end station 272 is a network interface that includes a network connector 232, non-magnetic transformer and choke power feed circuitry 262, a network physical layer 236, and a power converter 238. Functionality of a magnetic transformer is replaced by circuitry 262. In the context of an Ethernet network interface, network connector 232 may be a RJ45 connector that is operable to receive multiple twisted wire pairs. Protection and conditioning circuitry may be located between network connector 232 and non-magnetic transformer and choke power feed circuitry 262 to attain surge protection in the form of voltage spike protection, lighting protection, external shock protection or other similar active functions. Conditioning circuitry may be a diode bridge or other rectifying component or device. A bridge or rectifier may couple to individual conductive lines 1-8 contained within the RJ45 connector. The circuits may be discrete components or an integrated circuit within non-magnetic transformer and choke power feed circuitry 262.

In the powered end station 272, conductors 1 through 8 of the network connector 232 couple to non-magnetic transformer and choke power feed circuitry 262. Non-magnetic transformer and choke power feed circuitry 262 may use the power feed circuit and separate the data signal portion from the power signal portion. The data signal portion may then be passed to the network physical layer (PHY) 236 while the power signal passes to power converter 238.

If the powered end station 272 is used to couple the network attached device or PD to an Ethernet network, network physical layer 236 may be operable to implement the 10 Mbps, 100 Mbps, and/or 1 Gbps physical layer functions as well as other Ethernet data protocols that may arise. The Ethernet PHY 236 may additionally couple to an Ethernet media access controller (MAC). The Ethernet PHY 236 and Ethernet MAC when coupled are operable to implement the hardware layers of an Ethernet protocol stack. The architecture may also be applied to other networks. If a power signal is not received but a traditional, non-power Ethernet signal is received the non-magnetic power feed circuitry 262 still passes the data signal to the network PHY.

The power signal separated from the network signal within non-magnetic transformer and choke power feed circuit 262 by the power feed circuit is supplied to power converter 238. Typically the power signal received does not exceed 57 volts SELV (Safety Extra Low Voltage). Typical voltage in an Ethernet application is 48-volt power. Power converter 238 may then further transform the power as a DC to DC converter to provide 1.8 to 3.3 volts, or other voltages specified by many Ethernet network attached devices.

Power-sourcing switch 270 includes a network connector 232, Ethernet or network physical layer 254, PSE controller 256, non-magnetic transformer and choke power supply circuitry 266, and possibly a multiple-port switch. Transformer functionality is supplied by non-magnetic transformer and choke power supply circuitry 266. Power-sourcing switch 270 may be used to supply power to network attached devices. Powered end station 272 and power sourcing switch 270 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All may be applied specifically to automotive networks for the distribution of power and data within the automobile to various monitoring circuits or for the distribution and powering of entertainment devices, such as entertainment systems, video and audio entertainment systems often found in today's vehicles. Other networks may include a high speed data network, low speed data network, time-triggered communication on CAN (TTCAN) network, a J1939-compliant network, ISO11898-compliant network, an ISO11519-2-compliant network, as well as other similar networks. Other embodiments may supply power to network attached devices over alternative networks such as but not limited to a Home-PNA local area network and other similar networks. Home-PNA uses existing telephone wires to share a single network connection within a home or building. Alternatively, embodiments may be applied where network data signals are provided over power lines.

Non-magnetic transformer and choke power feed circuitry 262 and 266 enable elimination of magnetic transformers with integrated system solutions that enable an increase in system density by replacing magnetic transformers with solid state power feed circuitry in the form of an integrated circuit or discreet component.

In some embodiments, non-magnetic transformer and choke power feed circuitry 262, network physical layer 236, power distribution management circuitry 254, and power converter 238 may be integrated into a single integrated circuit rather than discrete components at the printed circuit board level. Optional protection and power conditioning circuitry may be used to interface the integrated circuit to the network connector 232.

The Ethernet PHY may support the 10/100/1000 Mbps data rate and other future data networks such as a 10000 Mbps Ethernet network. Non-magnetic transformer and choke power feed circuitry 262 supplies line power minus the insertion loss directly to power converter 238, converting power first to a 12V supply then subsequently to lower supply levels. The circuit may be implemented in any appropriate process, for example a 0.18 or 0.13 micron process or any suitable size process.

Non-magnetic transformer and choke power feed circuitry 262 may implement functions including IEEE 802.3.af signaling and load compliance, local unregulated supply generation with surge current protection, and signal transfer between the line and integrated Ethernet PHY. Since devices are directly connected to the line, the circuit may be implemented to withstand a secondary lightning surge.

For the power over Ethernet (PoE) to be IEEE 802.3af standard compliant, the PoE may be configured to accept power with various power feeding schemes and handle power polarity reversal. A rectifier, such as a diode bridge, a switching network, or other circuit, may be implemented to ensure power signals having an appropriate polarity are delivered to nodes of the power feed circuit. Any one of the conductors 1, 4, 7 or 3 of the network RJ45 connection can forward bias to deliver current and any one of the return diodes connected can forward bias to form a return current path via one of the remaining conductors. Conductors 2, 5, 8 and 4 are connected similarly.

Non-magnetic transformer and choke power feed circuitry 262 applied to PSE may take the form of a single or multiple port switch to supply power to single or multiple devices attached to the network. Power sourcing switch 270 may be operable to receive power and data signals and combine to communicate power signals which are then distributed via an attached network. If power sourcing switch 270 is a gateway or router, a high-speed uplink couples to a network such as an Ethernet network or other network. The data signal is relayed via network PHY 254 and supplied to non-magnetic transformer and choke power feed circuitry 266. PSE switch 270 may be attached to an AC power supply or other internal or external power supply to supply a power signal to be distributed to network-attached devices that couple to power sourcing switch 270. Power controller 256 within or coupled to non-magnetic transformer and choke power feed circuitry 266 may determine, in accordance with IEEE standard 802.3af, whether a network-attached device in the case of an Ethernet network-attached device is a device operable to receive power from power supply equipment. When determined that an IEEE 802.3af compliant powered device (PD) is attached to the network, power controller 256 may supply power from power supply to non-magnetic transformer and choke power feed circuitry 266, which is sent to the downstream network-attached device through network connectors, which in the case of the Ethernet network may be an RJ45 receptacle and cable.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A network device comprising:
    a dynamic power management controller adapted for coupling to a network connector that connects to a network cable in a configuration that transfers power and communication signals to a Powered Device (PD), the dynamic power management controller configured to transmit power management information over the network cable at a Transmission Control Protocol/Internet Protocol (TCP/IP) layer and/or a Media Access Control (MAC) layer;
    the dynamic power management controller further configured to send detection and classification information in a plurality of phases and a plurality of cycles at a physical layer from the Powered Device (PD) to a Power Sourcing Equipment (PSE).

2. The network device according to claim 1 further comprising:
    the dynamic power management controller configured to encode an Ethernet packet at the Transmission Control Protocol/Internet Protocol (TCP/IP) layer that requests a supply power level from a Power Sourcing Equipment (PSE) device.

3. The network device according to claim 1 further comprising:
    the dynamic power management controller configured to encode Type of Service (TOS) bits in a Transmission Control Protocol/Internet Protocol (TCP/IP) header of the TCP/IP layer to assign priority for traffic for statistical power management.

4. The network device according to claim 1 further comprising:
    the dynamic power management controller configured to encode an Ethernet packet at the Transmission Control Protocol/Internet Protocol (TCP/IP) layer for sending to a Power Sourcing Equipment (PSE) device a request identifying at least one information item selected from a group consisting of current Powered Device (PD) operating power, anticipated PD operating power, PD device identification, PD device operating information, and PD device priority assignment.

5. The network device according to claim 1 further comprising:
the dynamic power management controller configured to encode 8b/10b reserved codes at the Media Access Control (MAC) layer that request a demand-based power from a Power Sourcing Equipment (PSE) device.

6. A network device comprising:
a dynamic power management controller adapted for coupling to a network connector that connects to a network cable in a configuration that sends power from a Power Sourcing Equipment (PSE) and communicates signals between the PSE and a Powered Device (PD), the dynamic power management controller configured to communicate power management information over the network cable at a Transmission Control Protocol/Internet Protocol (TCP/IP) layer and/or a Media Access Control (MAC) layer;
the dynamic power management controller further configured to receive at the Power Sourcing Equipment (PSE) detection and classification information in a plurality of phases and a plurality of cycles at a physical layer from the Powered Device (PD) and send operational information from the PSE to the PD at the physical layer.

7. The network device according to claim 6 further comprising:
the dynamic power management controller configured to decode an Ethernet packet at the Transmission Control Protocol/Internet Protocol (TCP/IP) layer received at the Power Sourcing Equipment (PSE) and to transmit power from the PSE to the requesting Powered Device (PD) at a supply power level according to the decoded packet.

8. The network device according to claim 6 further comprising:
the dynamic power management controller configured to decode Type of Service (TOS) bits in a Transmission Control Protocol/Internet Protocol (TCP/IP) header of the TCP/IP layer and enforce priority for traffic to at least one requesting Powered Device (PD) using statistical power management.

9. The network device according to claim 6 further comprising:
the dynamic power management controller configured to decode an Ethernet packet at the Transmission Control Protocol/Internet Protocol (TCP/IP) layer received at the Power Sourcing Equipment (PSE) and to transmit power from the PSE to the requesting Powered Device (PD) at a supply power level according to at least one information item in the decoded packet, the at least one information item selected from a group consisting of current Powered Device (PD) operating power, anticipated PD operating power, PD device identification, PD device operating information, and PD device priority assignment.

10. The network device according to claim 6 further comprising:
the dynamic power management controller configured to decode 8b/10b reserved codes at the Media Access Control (MAC) layer received at the Power Sourcing Equipment (PSE) and to transmit demand-based power from the PSE to the requesting Powered Device (PD) at a supply power level according to the decoded reserved codes.

11. A network system comprising:
dynamic power management controllers respectively configured for usage in a Power Sourcing Equipment (PSE) and a Powered Device (PD) coupled by a network cable in a configuration that transfers power and communication signals from the PSE to the PD, the dynamic power management controllers configured to communicate power management information over the network cable at a Transmission Control Protocol/Internet Protocol (TCP/IP) layer and/or a Media Access Control (MAC) layer;
a dynamic power management controller at the Powered Device (PD) further configured to send detection and classification information in a plurality of phases and a plurality of cycles at a physical layer to the Power Sourcing Equipment (PSE); and
a dynamic power management controller at the PSE further configured to receive the detection and classification information and send operational information from the PSE to the PD at the physical layer.

12. The network system according to claim 11 further comprising:
a dynamic power management controller at the Powered Device (PD) configured to encode and send an Ethernet packet at the Transmission Control Protocol/Internet Protocol (TCP/IP) layer that requests a supply power level from a Power Sourcing Equipment (PSE) device; and
a dynamic power management controller at the PSE configured to receive and decode the Ethernet packet and to transmit power from the PSE to the requesting PD at a supply power level according to the decoded packet.

13. The network system according to claim 11 further comprising:
a dynamic power management controller at the Powered Device (PD) configured to encode and send Type of Service (TOS) bits in a Transmission Control Protocol/Internet Protocol (TCP/IP) header of the TCP/IP layer to assign priority for traffic for statistical power management; and
a dynamic power management controller at the Power Sourcing Equipment (PSE) configured to receive and decode the Type of Service (TOS) bits and enforce priority for traffic to at least one requesting Powered Device (PD) using statistical power management.

14. The network system according to claim 11 further comprising:
a dynamic power management controller at the Powered Device (PD) configured to encode an Ethernet packet at the Transmission Control Protocol/Internet Protocol (TCP/IP) layer and send the Ethernet packet to a Power Sourcing Equipment (PSE) device a request identifying at least one information item selected from a group consisting of current PD operating power, anticipated PD operating power, PD device identification, PD device operating information, and PD device priority assignment; and
a dynamic power management controller at the PSE configured to decode the Ethernet packet and transmit power from the PSE to the requesting PD at a supply power level according to at least one information item in the decoded Ethernet packet.

15. The network system according to claim 11 further comprising:
a dynamic power management controller at the Powered Device (PD) configured to encode and send 8b/10b reserved codes at the Media Access Control (MAC) layer that request a demand-based power from a Power Sourcing Equipment (PSE) device; and a dynamic power management controller at the PSE configured to receive and decode the 8b/10b reserved codes and to transmit demand-based power from the PSE to the requesting PD at a supply power level according to the decoded reserved codes.

16. The network system according to claim 11 further comprising:
the Powered Device (PD) and the Power Sourcing Equipment (PSE) configured for Power-over-Ethernet (PoE) operation.

17. A power management method comprising:
transmitting power from a Power Sourcing Equipment (PSE) to a Powered Device (PD) via a network cable;
bidirectionally communicating signals between the PSE and the PD via the network cable;
bidirectionally communicating power management information over the network cable at a Transmission Control Protocol/Internet Protocol (TCP/IP) layer and/or a Media Access Control (MAC) layer;
sending detection and classification information in a plurality of phases and a plurality of cycles at a physical layer from the Powered Device (PD) to the Power Sourcing Equipment (PSE);
receiving the detection and classification information at the PSE; and
sending operational information from the PSE to the PD at the physical layer.

18. The method according to claim 17 further comprising:
encoding at the Powered Device (PD) an Ethernet packet at the Transmission Control Protocol/Internet Protocol (TCP/IP) layer that requests a supply power level from a Power Sourcing Equipment (PSE) device;
sending the Ethernet packet from the PD to the PSE;
receiving the Ethernet packet at the PSE;
decoding the Ethernet packet; and
transmitting power from the PSE to the requesting PD at a supply power level according to the decoded packet.

19. The method according to claim 17 further comprising:
encoding at the Powered Device (PD) Type of Service (TOS) bits in a Transmission Control Protocol/Internet Protocol (TCP/IP) header of the TCP/IP layer to assign traffic priority for statistical power management;
sending the TOS bits from the PD to the PSE;
receiving the TOS bits at the PSE;
decoding the TOS bits; and
enforcing priority for traffic to at least one requesting PD using statistical power management.

20. The method according to claim 17 further comprising:
encoding at the Powered Device (PD) an Ethernet packet at the Transmission Control Protocol/Internet Protocol (TCP/IP) layer;
sending in the Ethernet packet to a Power Sourcing Equipment (PSE) device a request identifying at least one information item selected from a group consisting of current PD operating power, anticipated PD operating power, PD device identification, PD device operating information, and PD device priority assignment;
receiving the Ethernet packet at the PSE;
decoding the Ethernet packet at the PSE; and
transmitting power from the PSE to the requesting PD at a supply power level according to at least one information item in the decoded Ethernet packet.

21. The method according to claim 17 further comprising:
encoding at the Powered Device (PD) 8b/10b reserved codes at the Media Access Control (MAC) layer that request a demand-based power from a Power Sourcing Equipment (PSE) device;
sending the 8b/10b reserved codes from the PD to the PSE;
receiving the 8b/10b reserved codes at the PSE;
decoding the 8b/10b reserved codes; and
transmitting demand-based power from the PSE to the requesting PD at a supply power level according to the decoded reserved codes.

* * * * *